United States Patent
Lu et al.

(10) Patent No.: US 12,408,102 B2
(45) Date of Patent: Sep. 2, 2025

(54) METHOD AND APPARATUS FOR NETWORK FUNCTION SERVICE DISCOVERY

(71) Applicant: Telefonaktiebolaget LM Ericsson (publ), Stockholm (SE)

(72) Inventors: Yunjie Lu, Shanghai (CN); Yiming Wu, Shanghai (CN); Åke Busin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 742 days.

(21) Appl. No.: 17/753,026

(22) PCT Filed: Nov. 22, 2019

(86) PCT No.: PCT/CN2019/120338
§ 371 (c)(1),
(2) Date: Feb. 15, 2022

(87) PCT Pub. No.: WO2021/027177
PCT Pub. Date: Feb. 18, 2021

(65) Prior Publication Data
US 2022/0295386 A1    Sep. 15, 2022

(30) Foreign Application Priority Data
Aug. 15, 2019  (WO) ............... PCT/CN2019/100806

(51) Int. Cl.
*H04W 48/16* (2009.01)
*H04L 67/51* (2022.01)
(Continued)

(52) U.S. Cl.
CPC ............ *H04W 48/16* (2013.01); *H04L 67/51* (2022.05); *H04W 48/18* (2013.01); *H04W 84/042* (2013.01)

(58) Field of Classification Search
None
See application file for complete search history.

(56) References Cited

U.S. PATENT DOCUMENTS 10,327,109 B1 *  6/2019  Maheshwari ......... H04W 4/029
10,609,530 B1 *  3/2020  Patil ...................... H04L 41/122
(Continued)

FOREIGN PATENT DOCUMENTS

CN    102783188 A    11/2012
JP    2013-516140 A    5/2013
(Continued)

OTHER PUBLICATIONS

3GPP TS 129 510 version 15.3.0 R15, 5G System—Network function repository services; Apr. 2019, p. 10-29. (Year: 2019).*
(Continued)

*Primary Examiner* — Ayman A Abaza
*Assistant Examiner* — Camquyen Thai
(74) *Attorney, Agent, or Firm* — Nicholson De Vos Webster & Elliott LLP

(57) ABSTRACT

Methods and apparatuses for network function service discovery. A method at a network function (NF) service consumer comprises sending a service request to a service discovery entity. The method further comprises receiving a service response from the service discovery entity. The service request includes a parameter indicating a client type that one or more candidate target NFs can serve.

21 Claims, 11 Drawing Sheets

(51) Int. Cl.
  *H04W 48/18* (2009.01)
  *H04W 84/04* (2009.01)

(56) References Cited

U.S. PATENT DOCUMENTS

| | | | | |
|---|---|---|---|---|
| 10,819,636 | B1* | 10/2020 | Goel | H04L 12/2858 |
| 2004/0180655 | A1* | 9/2004 | Jang | H04W 4/90 |
| | | | | 455/433 |
| 2005/0063417 | A1* | 3/2005 | Berranger | G06F 9/54 |
| | | | | 370/465 |
| 2011/0159893 | A1 | 6/2011 | Siomina et al. | |
| 2017/0303259 | A1* | 10/2017 | Lee | H04W 28/16 |
| 2019/0230556 | A1 | 7/2019 | Lee | |
| 2019/0251241 | A1* | 8/2019 | Bykampadi | H04W 12/009 |
| 2020/0028920 | A1* | 1/2020 | Livanos | H04W 8/26 |
| 2020/0228613 | A1 | 7/2020 | Han | |
| 2021/0044481 | A1* | 2/2021 | Xu | H04W 72/02 |
| 2021/0127265 | A1* | 4/2021 | Chandramouli | H04L 67/51 |
| 2021/0385286 | A1 | 12/2021 | Wang et al. | |
| 2022/0182923 | A1* | 6/2022 | Yao | H04W 24/10 |

FOREIGN PATENT DOCUMENTS

| | | |
|---|---|---|
| WO | 2019/061400 A1 | 4/2019 |
| WO | 2019/062596 A1 | 4/2019 |
| WO | 2019/076801 A1 | 4/2019 |
| WO | 2019/144321 A1 | 8/2019 |

OTHER PUBLICATIONS

3GPP TR 23.742 V1.1.0, "3rd Generation Partnership Project; Technical Specification Group Services and System Aspects; Study on Enhancements to the Service-Based Architecture (Release 16)," Oct. 2018, 127 pages, 3GPP Organizational Partners.
Extended European Search Report, EP Application No. 19941061.4, Jul. 7, 2023, 9 pages.
First Office Action, Including Search Report, CN App. No. 201980099324.6, May 12, 2023, 14 pages (3 pages of English Translation and 11 pages of Original Document).
Notice of Reasons for Rejection, JP App. No. 2022-508519, May 30, 2023, 10 pages (5 pages of English Translation and 05 pages of Original Document).
Ericsson, "Use of results of NF/NF service discovery for NF/NF service selection", May 28-Jun. 1, 2018, 7 pages, 3GPP TSG-SA WG2 Meeting #127bis, S2-185779 was S2-184768, Newport Beach, US.
Office Action, CN App. No. 201980099324.6, Jan. 10, 2024, 27 pages (14 pages of English Translation and 13 pages of Original Document).
Office Action, CN App. No. 201980099324.6, Mar. 30, 2024, 31 pages (17 pages of English Translation and 14 pages of Original Document).
Office Action, JP App. No. 2022-508519, Feb. 27, 2024, 10 pages (5 pages of English Translation and 5 pages of Original Document).
International Search Report and Written Opinion for Application No. PCT/CN2019/120338, dated May 14, 2020, 7 pages.
International Preliminary Report on Patentability for Application No. PCT/CN2019/120338, dated Dec. 15, 2021, 7 pages.
3GPP TS 23.273 V16.0.0, "3rd Generation Partnership Project; Technical Specification Group Services and System Aspects; 5G System (5GS) Location Services (LCS); Stage 2 (Release 16)," Jun. 2019, 86 pages, 3GPP Organizational Partners.
3GPP TS 23.501 V16.0.2, "3rd Generation Partnership Project; Technical Specification Group Services and System Aspects; System Architecture for the 5G System; Stage 2 (Release 16)," Apr. 2019, 317 pages, 3GPP Organizational Partners.
3GPP TS 23.502 V15.5.1, "3rd Generation Partnership Project; Technical Specification Group Services and System Aspects; Procedures for the 5G System; Stage 2 (Release 15)," Apr. 2019, 354 pages, 3GPP Organizational Partners.
3GPP TS 23.502 V16.1.0, "3rd Generation Partnership Project; Technical Specification Group Services and System Aspects; Procedures for the 5G System; Stage 2 (Release 16)," Jun. 2019, 500 pages, 3GPP Organizational Partners.
3GPP TS 23.502 V16.1.1, "3rd Generation Partnership Project; Technical Specification Group Services and System Aspects; Procedures for the 5G System; Stage 2 (Release 16)," Jun. 2019, 495 pages, 3GPP Organizational Partners.
3GPP TS 29.501 V16.0.0, "3rd Generation Partnership Project; Technical Specification Group Core Network and Terminals; 5G System; Principles and Guidelines for Services Definition; Stage 3 (Release 16)," Jun. 2019, 69 pages, 3GPP Organizational Partners.
3GPP TS 29.510 V15.0.0, "3rd Generation Partnership Project; Technical Specification Group Core Network and Terminals; 5G System; Network Function Repository Services; Stage 3 (Release 15)," Jun. 2018, 64 pages, 3GPP Organizational Partners.
3GPP TS 29.510 V16.0.0, "3rd Generation Partnership Project; Technical Specification Group Core Network and Terminals; 5G System; Network Function Repository Services; Stage 3 (Release 16)," Jun. 2019, 135 pages, 3GPP Organizational Partners.
3GPP TS 29.518 V16.0.0, "3rd Generation Partnership Project; Technical Specification Group Core Network and Terminals; 5G System; Access and Mobility Management Services; Stage 3 (Release 16)," Jun. 2019, 199 pages, 3GPP Organizational Partners.
3GPP TS 29.520 V16.0.0, "3rd Generation Partnership Project; Technical Specification Group Core Network and Terminals; 5G System; Network Data Analytics Services; Stage 3 (Release 16)," Jun. 2019, 42 pages, 3GPP Organizational Partners.
3GPP TS 29.571 V16.0.0, "3rd Generation Partnership Project; Technical Specification Group Core Network and Terminals; 5G System; Common Data Types for Service Based Interfaces; Stage 3 (Release 16)," Jun. 2019, 79 pages, 3GPP Organizational Partners.
3GPP TS 29.572 V15.4.0, "3rd Generation Partnership Project; Technical Specification Group Core Network and Terminals; 5G System; Location Management Services; Stage 3 (Release 15)," Jun. 2019, 35 pages, 3GPP Organizational Partners.
Nokia et al., "Pseudo-CR on NRF service subscription and notification," Nov. 27-Dec. 1, 2017, 5 pages, 3GPP TSG CT4 Meeting #81, C4-176240, Reno, Nevada, US.
Huawei et al., "Pseudo CR on TS 23.501 for clarification of NF service authorization information," Aug. 21-25, 2017, 3 pages, SA WG2 Meeting #122Bis, S2-175783, Sophia Antipolis, France.
Orange, "Clarification on terminology in NF service framework procedures," Aug. 20-24, 2018, 4 pages, 3GPP TSG-SA2 Meeting #128Bis, S2-188915, Sophia Antipolis, France.
Ericsson, "Reselection clarification," Jun. 24-28, 2019, 4 pages, 3GPP TSG-SA WG2 Meeting #134, S2-1906969, Sapporo, Japan.

* cited by examiner

200

202

Sending a service request to a service discovery entity, wherein the service request includes a parameter indicating a service type and/or a client type that one or more candidate target NFs can serve

204

Receiving a service response from the service discovery entity

METHOD AND APPARATUS FOR NETWORK FUNCTION SERVICE DISCOVERY

CROSS-REFERENCE TO RELATED APPLICATIONS

This application is a National stage of International Application No. PCT/CN2019/120338, filed Nov. 22, 2019, which claims priority to International Application No. PCT/CN2019/100806, filed Aug. 15, 2019, which are hereby incorporated by reference.

TECHNICAL FIELD

The non-limiting and exemplary embodiments of the present disclosure generally relate to the technical field of communications, and specifically to methods and apparatuses for network function service discovery.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network, one or more network entities (NEs) may be deployed to serve certain purposes, e.g., a specific Location Management Function (LMF) deployed in operator network dedicated only for emergency, a dedicated LMF to handle "value added service" traffic to avoid impacts to normal users, etc. In order to access a network entity serving a specific purpose, the information of the network entity is usually pre-configured in some nodes, e.g., Evolved Serving Mobile Location Centre (E-SMLC) is configured in mobility management entity (MME) for emergency positioning.

As described in the third Generation Partnership Project (3GPP) TS 23.502 V16.1.1, in fifth generation (5G) core network (5GC) service based architecture (SBA), instead of pre-configuration, a service consumer can discover a network function service producer via Network Function Repository Function (NRF), i.e., a network function (NF) service producer can register its supported one or more services with access information into NRF, and an NF service consumer can discover a desired NF service and the access information from NRF.

In addition, in delegate mode, a NF service consumer may directly send a service request to a service communication proxy (SCP). The service request may include discovery and selection parameters necessary to discover and select a NF service producer instance. The SCP may perform discovery upon the request either by interacting with an NRF using Nnrf_NFDiscovery service or may use information collected during the previous interactions with an NRF (by using the Nnrf_NFDiscovery service or Nnrf_NFManagement_NFStatusNotify service operation). If the NE service consumer is authorized to communicate with the selected NF service producer, the SCP may forward the service request to the selected NE service producer.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In current 5GC architecture, the NRF doesn't support any indication that an NF can serve one or more certain service types and/or client types in service registration and service discovery, which may result in some problems. For example, an NF service producer cannot register the information that it is serving one or more certain service types and/or client types, when registering its NF profile into the NRF. An NF service consumer cannot query the specific NF service producer instance serving a certain service type and/or a certain client type. In the delegate mode, the NF service consumer cannot inform SCP that the service request is related to a certain service type and/or a certain client type, thus SCP can not select a specific NF service producer serving the required service type and/or client type.

To overcome or mitigate at least one above mentioned problems or other problems or provide a useful solution, the embodiments of the present disclosure propose an improved network function service discovery solution.

In an embodiment, an indication of serving type (such as service type and/or client type) may be introduced on 5GC NF service framework, in both service registration procedure and service discovery procedure. For example, when an NF service producer registered into the NF service framework (e.g. into NRF), it can carry the indication of serving type if it is provisioned with certain serving type(s) (e.g. emergency service, lawful intercept service, value added service, etc.).

In an embodiment, when an NF service consumer wants to discover a NF service producer(s) for certain NF serving type(s), it can pass the indication of serving type as query parameter in the discovery request (e.g. NRF discovery request). The NF service framework (e.g. NRF) can match the registered NF service producers by using the serving type(s) in the discovery request and return matched one or more NF service producers with the supported serving type(s) in their NF profiles. If no registered NF producer instance matching the required serving type, the service framework (e.g. NRF) may return other available producer instances.

In an embodiment, when an NF service consumer is going to invoke a service operation of a certain NF serving type, it can pass an indication indicating the required NF serving type as a discovery and selection parameter to SCP. The SCP then can select a NF service producer instance matching the serving type to relay the service request. If no NF producer instance is registered with the required NE serving type, the SCP may relay the request to another available NF service producer.

In a first aspect of the disclosure, there is provided a method at a network function (NF) service consumer. The method comprises sending a service request to a service discovery entity. The method further comprises receiving a service response from the service discovery entity. The service request includes a parameter indicating a client type that one or more candidate target NFs can serve.

In an embodiment, the service discovery entity may be a first network repository function (NRF), the service request may be an Nnrf_NFDiscovery_Request and the service response may be an Nnrf_NFDiscovery_Request response.

In an embodiment, the NF service consumer may be also a NF service producer and the method may further comprise sending a NF service register request including the NF service producer's profile to a NRF, wherein the NF service producer's profile includes at least one client type that the NF service producer can dedicatedly serve. The method may further comprise receiving a NF service register response from the NRF.

In an embodiment, the method may further comprise sending a NF service update request including the NF service producer's updated profile to a NRF, wherein the NF service producer's updated profile includes at least one updated client type that the NF service producer can dedicatedly serve. The method may further comprise receiving a NF service update response from the NRF.

In an embodiment, the NE service consumer may be a second NRF in a second public land mobile network (PLMN) and the first NRF may be a NRF in a first PLMN.

In an embodiment, the method may further comprise receiving the Nnrf_NFDiscovery_Request from another NF service consumer in the second PLMN. The method may further comprise sending the Nnrf_NFDiscovery_Request Response to said another NF service consumer in the second PLMN.

In an embodiment, said another NF service consumer may be a service communication proxy (SCP).

In an embodiment, the service discovery entity may be a service communication proxy (SCP), and the parameter indicating the client type may be used as one of discovery and selection parameters.

In an embodiment, the service type and/or client type may include at least one of an emergency service; a value added service; an operator service; a lawful intercept service; a broadcast service; an operator operations & maintenance service; an operator anonymous statistics service; or an operator target mobile station service support service.

In an embodiment, the target NF may be location management function, LMF, or gateway mobile location centre, GMLC In an embodiment, the service request may include a client-type query parameter indicating one of external client types in a list dedicatedly served by a target NF.

In an embodiment, the service response may include information of at least one NF instance of a target NF when the target NF matching the service request can be found or includes information of at least one other NF instance not dedicatedly serving the requested client type when the target NF matching the service request cannot be found.

In a second aspect of the disclosure, there is provided a method at a service discovery entity. The method comprises receiving a service request from a network function (NF) service consumer. The method further comprises sending a service response to the NF service consumer. The service request includes a parameter indicating a client type that one or more candidate target NFs can serve.

In an embodiment, the method may further comprise receiving a NF service register request including a NF service producer's profile from the NF service producer. The NF service producer's profile may include at least one client type that the NF service producer can dedicatedly serve. The method may further comprise storing the NF service producer's profile. The method may further comprise sending a NF service register response to the NF service producer.

In an embodiment, the method may further comprise receiving a NF service update request including the NF service producer's updated profile from the NF service producer. The NF service producer's updated profile may include at least one updated client type that the NF service producer can dedicatedly serve. The method may further comprise updating the NF service producer's profile. The method may further comprise sending a NF service update response to the NF service producer.

In an embodiment, the service discovery entity may be a service communication proxy (SCP), the parameter indicating the client type may be used as one of discovery and selection parameters, and the method may further comprise discovering and selecting a target NF service producer based on the discovery and selection parameters. The method may further comprise when the NF service consumer is authorized to communicate with the selected NF service producer, forwarding the service request to the selected NF service producer. The method may further comprise receiving the service response from the selected NF service producer.

In a third aspect of the disclosure, there is provided a method at a network function (NF) service producer. The method comprises sending a NF service register request including the NF service producer's profile to a network repository function (NRF). The NE service producer's profile includes at least one client type that the NF service producer can dedicatedly serve. The method further comprises receiving a NE service register response from the NRF.

In an embodiment, the method may further comprise sending a NF service update request including the NF service producer's updated profile to the NRF. The NF service producer's updated profile may include at least one updated client type that the NE service producer can dedicatedly serve. The method may further comprise receiving a NF service update response from the NRF.

In an embodiment, the NF service producer is location management function, LMF, or gateway mobile location centre, GMLC.

In another aspect of the disclosure, there is provided an apparatus at a network function (NE) service consumer. The apparatus comprises a processor; and a memory coupled to the processor, said memory containing instructions executable by said processor, whereby said apparatus is operative to send a service request to a service discovery entity. Said apparatus is further operative to receive a service response from the service discovery entity. The service request includes a parameter indicating a client type that one or more candidate target NFs can serve.

In another aspect of the disclosure, there is provided an apparatus at a service discovery entity. The apparatus comprises a processor; and a memory coupled to the processor, said memory containing instructions executable by said processor, whereby said apparatus is operative to receive a service request from a network function (NF) service consumer. Said apparatus is further operative to send a service response to the NF service consumer. The service request includes a parameter indicating a client type that one or more candidate target NFs can serve.

In another aspect of the disclosure, there is provided an apparatus at a network function (NF) service producer. The apparatus comprises a processor; and a memory coupled to the processor, said memory containing instructions executable by said processor, whereby said apparatus is operative to send a NF service register request including the NF service producer's profile to a network repository function (NRF). The NF service producer's profile includes at least one client type that the NE service producer can dedicatedly serve. Said apparatus is further operative to receive a NF service register response from the NRF.

In another aspect of the disclosure, there is provided a NF service consumer. The NE service consumer comprises a sending module and a receiving module. The sending module may be configured to send a service request to a service discovery entity. The service request may include a parameter indicating a client type that one or more candidate target NFs can serve. The receiving module may be configured to receive a service response from the service discovery entity.

In another aspect of the disclosure, there is provided a service discovery entity. The service discovery entity comprises a receiving module and a sending module. The receiving module may be configured to receive a service request from a network function (NF) service consumer. The service request may include a parameter indicating a client type that one or more candidate target NFs can serve. The sending module may be configured to send a service response to the NF service consumer.

In another aspect of the disclosure, there is provided a NF service producer. The NF service producer comprises a sending module and a receiving module. The sending module may be configured to send a NF service register request including the NF service producer's profile to a network repository function (NRF). The NF service producer's profile may include at least one client type that the NF service producer can dedicatedly serve. The receiving module may be configured to receive a NF service register response from the NRF.

In another aspect of the disclosure, there is provided a computer-readable storage medium storing instructions which when executed by at least one processor, cause the at least one processor to perform the method according to the first aspect of the disclosure.

In another aspect of the disclosure, there is provided a computer program product, comprising instructions which, when executed on at least one processor, cause the at least one processor to carry out the method according to the first aspect of the disclosure.

In another aspect of the disclosure, there is provided a computer-readable storage medium storing instructions which when executed by at least one processor, cause the at least one processor to perform the method according to the second aspect of the disclosure.

In another aspect of the disclosure, there is provided a computer program product, comprising instructions which, when executed on at least one processor, cause the at least one processor to carry out the method according to the second aspect of the disclosure.

In another aspect of the disclosure, there is provided a computer-readable storage medium storing instructions which when executed by at least one processor, cause the at least one processor to perform the method according to the third aspect of the disclosure.

In another aspect of the disclosure, there is provided a computer program product, comprising instructions which, when executed on at least one processor, cause the at least one processor to carry out the method according to the third aspect of the disclosure.

Many advantages may be achieved by applying the proposed solution according to embodiments of the present disclosure. For example, with proposed solution, 5GC service framework can aware service producers which are serving a specific service type and/or a specific client type such as emergency service. An operator can deploy NF service instances specifically or dedicatedly serving a specific service type and/or a specific client type with higher serviceability (e.g. dedicated over-dimensioned resources to secure the availability and throughput). Service operations for a specific service type and/or a specific client type such as emergency service can be accurately relayed and handled by some NF service producers dedicatedly serving the specific service type and/or the specific client type to ensure the service quality.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figures 1, 2:
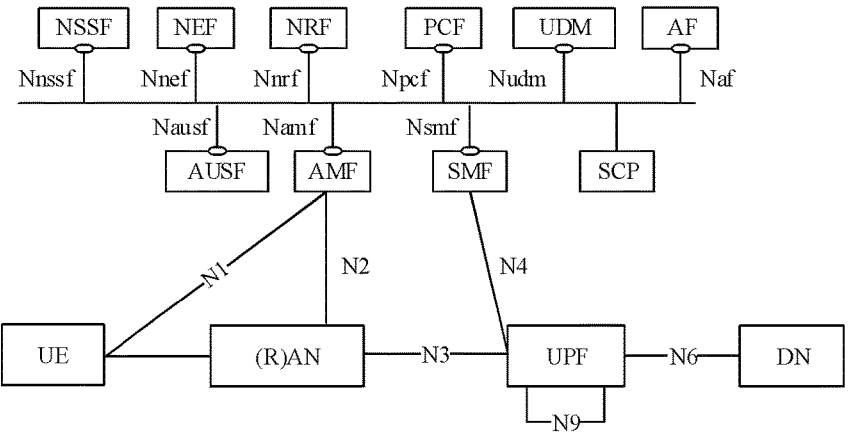
FIG. 1 schematically shows a high level architecture in the next generation network.
FIG. 2 shows a flowchart of a method according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR). In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the 5G communication protocols, and/or any other protocols either currently known or to be developed in the future.

The term "network entity" or "network node" used herein refers to a network device such as a core network device in a communication network. For example, in a wireless communication network such as a 3GPP-type cellular network, the network node may implement various network functions, which may offer numerous services to customers who are interconnected by an access network device. Each access network device is connectable to the core network device over a wired or wireless connection.

The term "network function (NF)" refers to any suitable function which can be implemented in a network node (physical or virtual) such as a core network node of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), (R)AN ((radio) access network), SCP, etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architecture illustrated in FIG. 1. For simplicity, the system architecture of FIG. 1 only depicts some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture in the next generation network such as 5G. The system architecture of FIG. 1 may comprise some exemplary elements such as AUSF, AMF, DN (data network), NEF, NRF, NSSF, PCF, SMF, UDM, UPF, AF, UE (user equipment), (R)AN, SCP, etc.

In accordance with an exemplary embodiment, the UE can establish a signaling connection with the AMF over the reference point N1, as illustrated in FIG. 1. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 1, the exemplary system architecture also contains the service-based interfaces such as Nnrf, Nnef, Nausf, Nudm, Npcf, Namf and Nsmf exhibited by NEs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.0.2, the disclosure of which is incorporated by reference herein in its entirety. For example, the NRF may support the following functionality: supporting service discovery function, for example receiving NF discovery request from NF instance or SCP, and providing the information of the discovered NF instances (be discovered) to the NF instance or SCP; maintaining the NF profile of available NF instances and their supported services; NF specific service authorization information; etc. The SCP may include one or more of the following functionalities: indirect communication, delegated discovery, message forwarding and routing to destination NF/NF service, etc. For example, in indirect communication, the NF service consumer communicates with the target NF service producer via a SCP. The NF service consumer may be configured to delegate the discovery of the target NF service producer to the SCP used for indirect communication. In this case, the SCP uses the parameters provided by NF service consumer to perform discovery and/or selection of the target NF service producer. The SCP address may be locally configured in NF service consumer. The SCP may be deployed in a distributed manner. More than one SCP can be present in the communication path between NF Services.

FIG. 2 shows a flowchart of a method according to an embodiment of the present disclosure, which may be performed by an apparatus implemented in/at or communicatively coupled to a NF service consumer. As such, the apparatus may provide means for accomplishing various parts of the method 200 as well as means for accomplishing other processes in conjunction with other components.

As used herein, the NF service consumer may be any suitable NF or NF instance which needs to use one or more services provided by another NF. The NF service producer may be any suitable NE or NE instance which can provide one or more services to one or more NE service consumers. For example, NRF can provide service discovery function to any other NF instance or SCP. In this case, NRF is the NF service producer and said any other NF instance or SCP is the NF service consumer. As another example, if an NF can provide one or more services to any other NFs, it will register its NF profile in the NRF. In this case the NE is the NE service consumer of NRF and the NF service producer of said any other NFs.

At block 202, the NE service consumer sends a service request to a service discovery entity. The service discovery entity may be an entity which can provide NF service discovery function. In addition, the service discovery entity may further provide any other function(s) such as indirect communication, delegated discovery, message forwarding and routing to destination NF/NF service, etc.

The service request may include a parameter indicating a service type and/or a client type that one or more candidate target NFs can serve. The service type and/or client type may be any suitable service type and/or the client type for example depending on a specific function of the candidate target NFs. In an embodiment, the service type and/or client type may include at least one of an emergency service; a value added service; an operator service; a lawful intercept service; a broadcast service; an operator operations & maintenance service; an operator anonymous statistics service; or an operator target mobile station service support service. In an embodiment, a candidate target NF can dedicatedly serve one or more service types and/or client types which include the service type and/or the client type indicated by the parameter.

The service request may be any suitable service request for example depending on the specific function of the service discovery entity. For example, when the service discovery entity such as NRF can provide NE service discovery function, the service request may be a NF service discovery request such as Nnrf_NFDiscovery_Request as described in clause 4.17.4 of 3GPP TS 23.502 V16.1.1. When the service discovery entity can provide NF service discovery and selection function, the service request may be a NF service discovery and selection request. When the service discovery entity such as SCP can provide NF service discovery and selection function and indirect communication, the service request may be a service request including discovery and selection parameters (i.e., the parameter) necessary to discover and select a NE service producer instance.

In an embodiment, the service discovery entity may be a service communication proxy (SCP), and the parameter may be used as a discovery and selection parameter.

At block 204, the NF service consumer receives a service response from the service discovery entity. The service response may be any suitable service response for example depending on the specific service request. For example, when the service discovery entity can provide NF service discovery function, the service request may be a NF service discovery request and the service response may be a NF service discovery response which may include information of a set of NF instance(s) matching the NF service discovery request. When the service discovery entity can provide NF service discovery and selection function, the service request may be a NF service discovery and selection request and the service response may be a NF service discovery and selection response which may include information of a selected NF instance matching the NF service discovery and selection request. When the service discovery entity can provide NF service discovery and selection function and indirect communication, the service request may be a service request including discovery and selection parameters (i.e., at least the parameter) necessary to discover and select a NF service producer instance and the service response may be a service response which may be generated by the target NF and received and forwarded by the service discovery entity to the NF service consumer.

In an embodiment, the service discovery entity may be a first network repository function (NRF), the service request may be an Nnrf_NFDiscovery_Request and the service response is an Nnrf_NFDiscovery_Request response as described in clause 4.17.4 of 3GPP TS 23.502 V16.1.1. It is noted that the Nnrf_NFDiscovery_Request includes the parameter indicating a service type and/or a client type that one or more candidate target NFs can serve.

Figure 3:
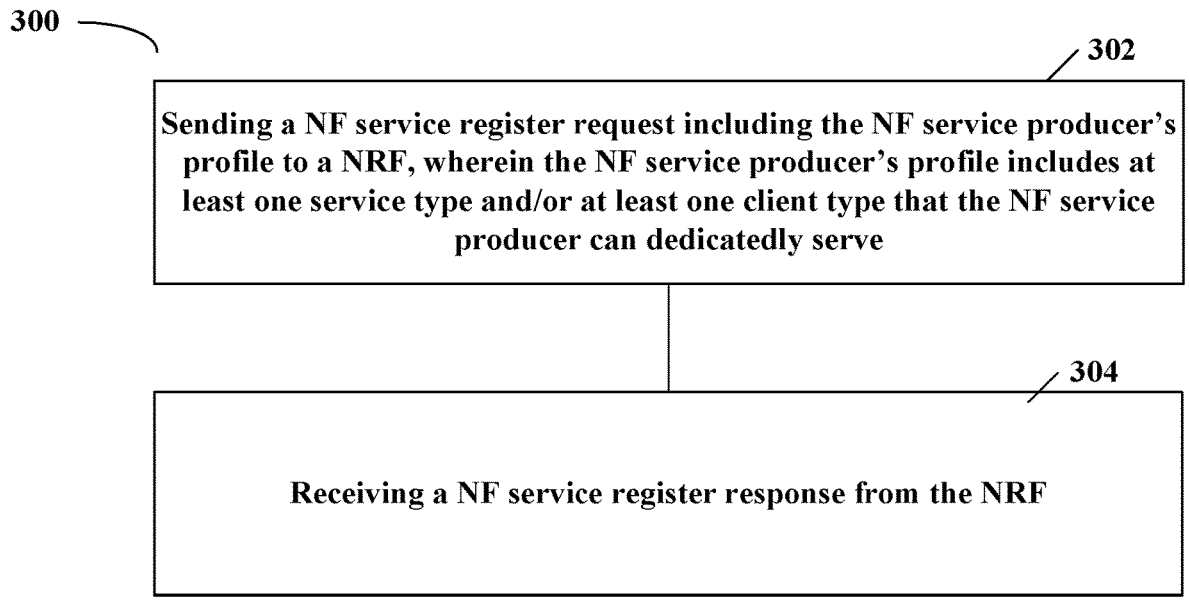
FIG. 3 shows a flowchart of a method according to another embodiment of the present disclosure.

FIG. 3 shows a flowchart of a method according to another embodiment of the present disclosure, which may be performed by an apparatus implemented in/at or communicatively coupled to a NF service consumer. As such, the apparatus may provide means for accomplishing various parts of the method 300 as well as means for accomplishing other processes in conjunction with other components. For some parts which have been described in the above embodiments, detailed description thereof is omitted here for brevity. In this embodiment, the NF service consumer is also a NF service producer which can dedicatedly serve at least one service type and/or at least one client type.

At block 302, the NF service producer sends a NF service register request including the NF service producer's profile to a NRF. The NF service producer's profile may include at least one service type and/or at least one client type that the NF service producer can dedicatedly serve. The NRF may be same as the first NRF or another NRF. The NF service register request may be an Nnrf_NFManagement_NFRegister Request message as described in clause 4.17.1 of 3GPP TS 23.502 V16.1.1 except that it further includes the at least one service type and/or at least one client type that the NF service producer can dedicatedly serve. For example, the NF service producer can send the NF service register request to the NRF to inform the NRF of its NF profile when the NF service consumer becomes operative for the first time. The NF service producer's profile may include any other suitable parameters, for example as described in clause 5.2.7.2.2 of 3GPP TS 23.502 V16.1.1.

The term "dedicatedly" as used herein may mean that the NF service producer can only serve at least one specific service type and/or at least one specific client type and will not serve any other service type and/or other client type even if the NF service consumer receives a service request with other service type and/or other client type. Alternatively, the term "dedicatedly" may mean that the NF service producer can provide service with high priority for at least one specific service type and/or at least one specific client type and provides service with low priority for other service type and/or other client type.

At block 304, the NF service producer receives a NF service register response from the NRF. For example, NRF may acknowledge that the NF service producer registration is accepted via an Nnrf_NFManagement_NFRegister response as described in clause 4.17.1 of 3GPP TS 23.502 V16.1.1.

Figure 4:
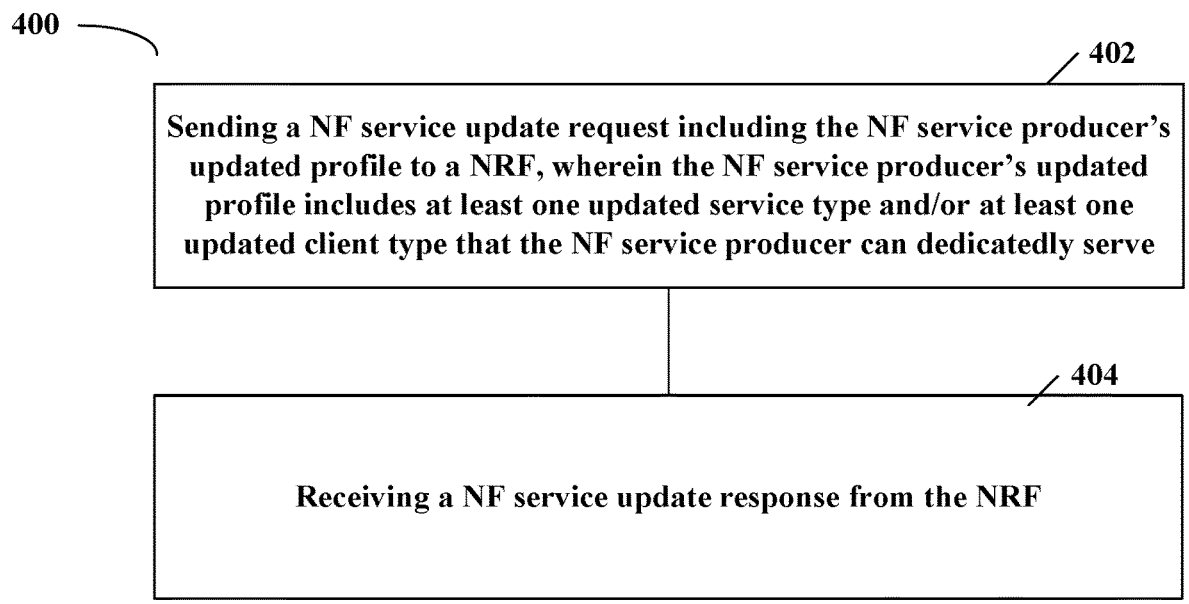
FIG. 4 shows a flowchart of a method according to another embodiment of the present disclosure.

FIG. 4 shows a flowchart of a method according to another embodiment of the present disclosure, which may be performed by an apparatus implemented in/at or communicatively coupled to a NF service consumer. As such, the apparatus may provide means for accomplishing various parts of the method 400 as well as means for accomplishing other processes in conjunction with other components. For some parts which have been described in the above embodiments, detailed description thereof is omitted here for brevity. In this embodiment, the NF service consumer is also a NF service producer which can dedicatedly serve at least one service type and/or at least one client type. It is noted that the NF service consumer may first perform method 300 and then perform method 400. Alternatively, the NF service consumer may first perform a normal NF service register procedure (for example without the parameter indicating a service type and/or a client type that the NF service consumer can serve) for example as described in clause 4.17.1 of 3GPP TS 23.502 V16.1.1 and then perform the method 400.

At block 402, the NF service producer sends a NF service update request including the NF service producer's updated profile to a NRF. The NF service producer's updated profile including at least one updated service type and/or at least one updated client type that the NF service producer can dedicatedly serve. The NRF may be same as the first NRF or another NRF. The NF service update request may be an Nnrf_NFManagement_NFUpdate Request message including the NF service producer's updated profile as described in clause 4.17.2 of 3GPP TS 23.502 V16.1.1 except that it further includes at least one updated service type and/or at least one updated client type that the NF service producer can dedicatedly serve. For example, the NF service producer can send the NF service update request to the NRF to inform the NRF of its updated NE profile (e.g. with updated capacity). The at least one updated service type and/or at least one updated client type may include at least one added and/or removed and/or modified service type and/or at least one added and/or removed and/or modified client type.

At block 404, the NF service producer receives a NF service update response from the NRF. For example, NRF may acknowledge that the NE service update is accepted via an Nnrf_NFManagement_NFUpdate response as described in clause 4.17.2 of 3GPP TS 23.502 V16.1.1.

Figure 5:
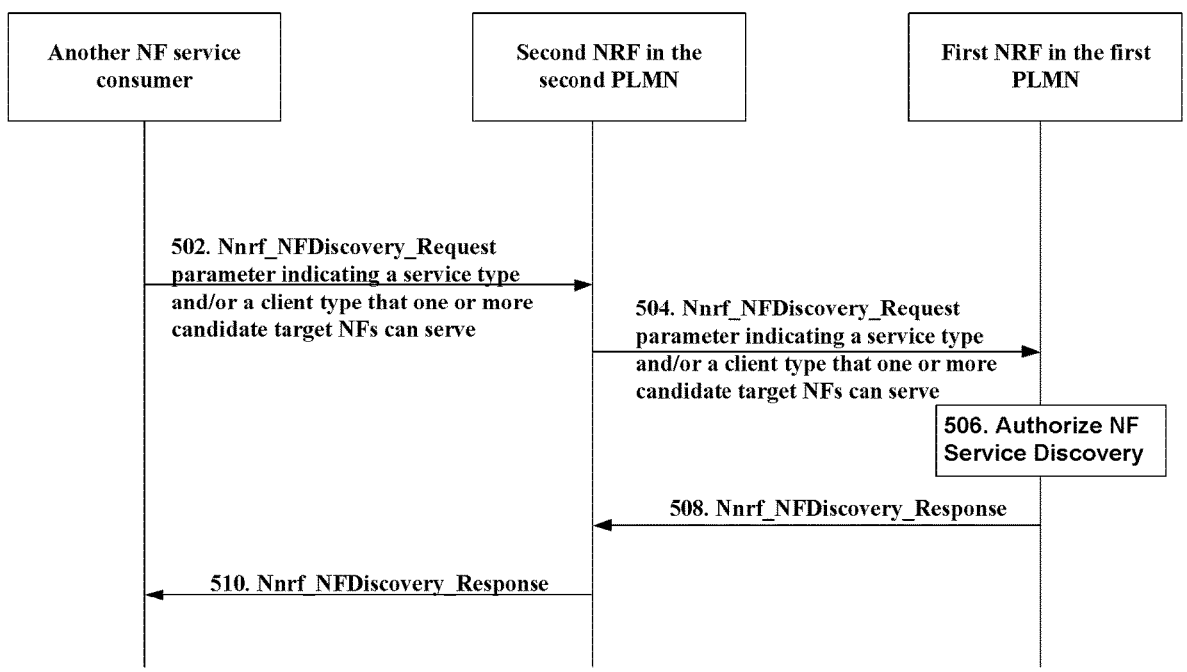
FIG. 5 shows a flowchart of a method according to another embodiment of the present disclosure.

FIG. 5 shows a flowchart of a method according to another embodiment of the present disclosure, which may be performed by an apparatus implemented in/at or communicatively coupled to a NF service consumer. As such, the apparatus may provide means for accomplishing various parts of the method 500 as well as means for accomplishing other processes in conjunction with other components. For some parts which have been described in the above embodiments, detailed description thereof is omitted here for brevity. In this embodiment, the NF service consumer is a second NRF in a second public land mobile network (PLMN) such as serving PLMN and the first NRF is a NRF in a first PLMN such as home PLMN. FIG. 5 shows NF/NF service discovery across PLMNs in the case of discovery made by the NF service consumer.

As used herein, when source NF (such as NF service consumer) and target NF (NE service producer) are located in different PLMNs, the source NE is said to be in the "Serving PLMN", and the target NE (and the NRF where such NE is registered) is said to be in the "Home PLMN", but the functionality shall be equally applicable to any scenario between any pair of PLMNs (e.g. with the source NF in the Home PLMN and the target NF in the Serving PLMN). When the NF instances are located in the same PLMN, both source NF and target NF are said to be located in the "Serving PLMN", but in the general case, the functionality is not restricted to the PLMN that is serving a given UE, and it shall be applicable as well to any scenario in which source NF and target NFs belong to the same PLMN.

At step 502, the second NRF receives the Nnrf_NFDiscovery_Request including a parameter indicating a service type and/or a client type that one or more candidate target NFs can serve from another NF service consumer in the second PLMN. For example, another NF service consumer in the serving PLMN (i.e., the second PLMN) may invoke Nnrf_NFDiscovery_Request (Expected Service Name, NF type of the expected NF, home PLMN ID, serving PLMN ID, NF type of the NF service consumer, the parameter indicating a service type and/or a client type that one or more candidate target NFs can serve) to the second NRF in the serving PLMN. The Nnrf_NFDiscovery_Request may also include other parameters.

At step 504, the second NRF sends the Nnrf_NFDiscovery_Request including the parameter indicating a service type and/or a client type that one or more candidate target NFs can serve to the first NRF. For example, the second NRF in serving PLMN identifies the first NRF in home PLMN (hNRF) (i.e., the first PLMN) based on the home PLMN ID, and it requests "NF Discovery" service from the first NRF in home PLMN to get the expected NF profile(s) of the NF instance(s) deployed in the home PLMN. As the second NRF in the serving PLMN triggers the "NF Discovery" on behalf of said another NF service consumer, the second NRF in the serving PLMN shall not replace the information of the service requester NF, i.e. NF consumer ID, in the discovery request message it sends to the hNRF.

At step 506, the first NRF authorizes the Nnrf_NFDiscovery_Request including the parameter indicating a service type and/or a client type that one or more candidate target NFs can serve. Based on the profile of the expected NF/NF service and the type of said another NF service consumer NF service consumer, the NRF determines whether said another NF service consumer is allowed to discover the expected NF instance(s). If the expected NF instance(s) or NF service instance(s) are deployed in a certain network slice, NRF authorizes the discovery request according to the discovery configuration of the network slice, e.g. the expected NF instance(s) are only discoverable by the NF in the same network slice.

At step 508, the second NRF receives an Nnrf_NFDiscovery_Request response from the first NRF. For example, if said another NF service consumer is allowed to discover the expected NF instance(s), the first NRF determines a set of NF instance(s) matching the Nnrf_NFDiscovery_Request including the parameter indicating a service type and/or a client type that one or more candidate target NFs can serve and internal policies of the NRF and sends the NF profile(s) of the determined NF instances to the second NRF via Nnrf_NFDiscovery_Request Response message.

At step 510, the second NRF sends the Nnrf_NFDiscovery_Request Response to said another NF service consumer in the second PLMN.

In an embodiment, said another NF service consumer may be a SCP. In this case the SCP may receive the Nnrf_NFDiscovery_Request from other NF service consumer in the second PLMN and send the Nnrf_NFDiscovery_Request Response to said other NF service consumer in the second PLMN.

Figure 6:
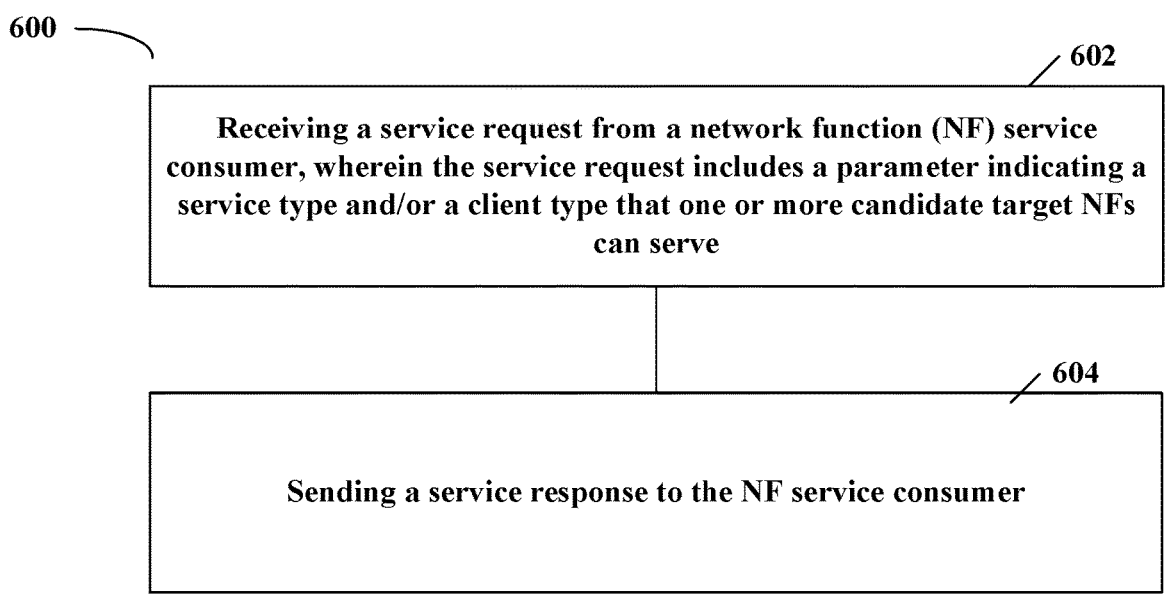
FIG. 6 shows a flowchart of a method according to another embodiment of the present disclosure.

FIG. 6 shows a flowchart of a method according to another embodiment of the present disclosure, which may be performed by an apparatus implemented in/at or communicatively coupled to a service discovery entity such as NRF or SCP. As such, the apparatus may provide means for accomplishing various parts of the method 600 as well as means for accomplishing other processes in conjunction with other components. For some parts which have been described in the above embodiments, detailed description thereof is omitted here for brevity.

At block 602, the service discovery entity receives a service request from a NF service consumer. The service request may include a parameter indicating a service type and/or a client type that one or more candidate target NFs can serve. For example, the NF service consumer may send the service request for example at block 204 of FIG. 2, and then the service discovery entity may receive the service request from the NF service consumer.

At block 604, the service discovery entity sends a service response to the NF service consumer. For example, as described above, the service request may be any suitable service request for example depending on the specific function of the service discovery entity. The service response may be any suitable service response for example depending on the specific service request. Depending on the specific type of the service discovery entity, the service discovery entity may perform different operations at block 604. For example, when the service discovery entity is NRF, the service discovery entity may try to determine a set of NF instance(s) matching the service request and send the NF profile(s) of the determined NF instances. Otherwise, the NRF may select other NF service producers and return them to the NF service consumer.

When the service discovery entity is SCP, it may perform discovery upon the service request including the parameter indicating a service type and/or a client type that one or more candidate target NFs can serve either by interacting with an NRF using Nnrf_NFDiscovery service or may use information collected during the previous interactions with an NRF (by the Nnrf_NFDiscovery service or Nnrf_NFManagement_NFStatusNotify service operation as described in clause 5.2.7.2.6 of 3GPP TS 23.502 V16.1.1). The SCP together with the NRF may authorize the request. The SCP may try to select the target NF service producer matching the service type and/or the client type. Otherwise, the NRF may select other NF service producers and return them to the NF service consumer. If the NF service consumer is authorized to communicate with the NF service producer, the SCP may forward the request to the selected NF service producer for example according to the configuration of the network slice, e.g. the expected NF instances are only reachable by NFs in the same network slice. The NF service producer may send a service response to the SCP. If the service request creates a resource in the NF service producer, the NF service producer may respond with a resource address identifying the created resource. The SCP may route the service response to the NF service consumer.

Figure 7:
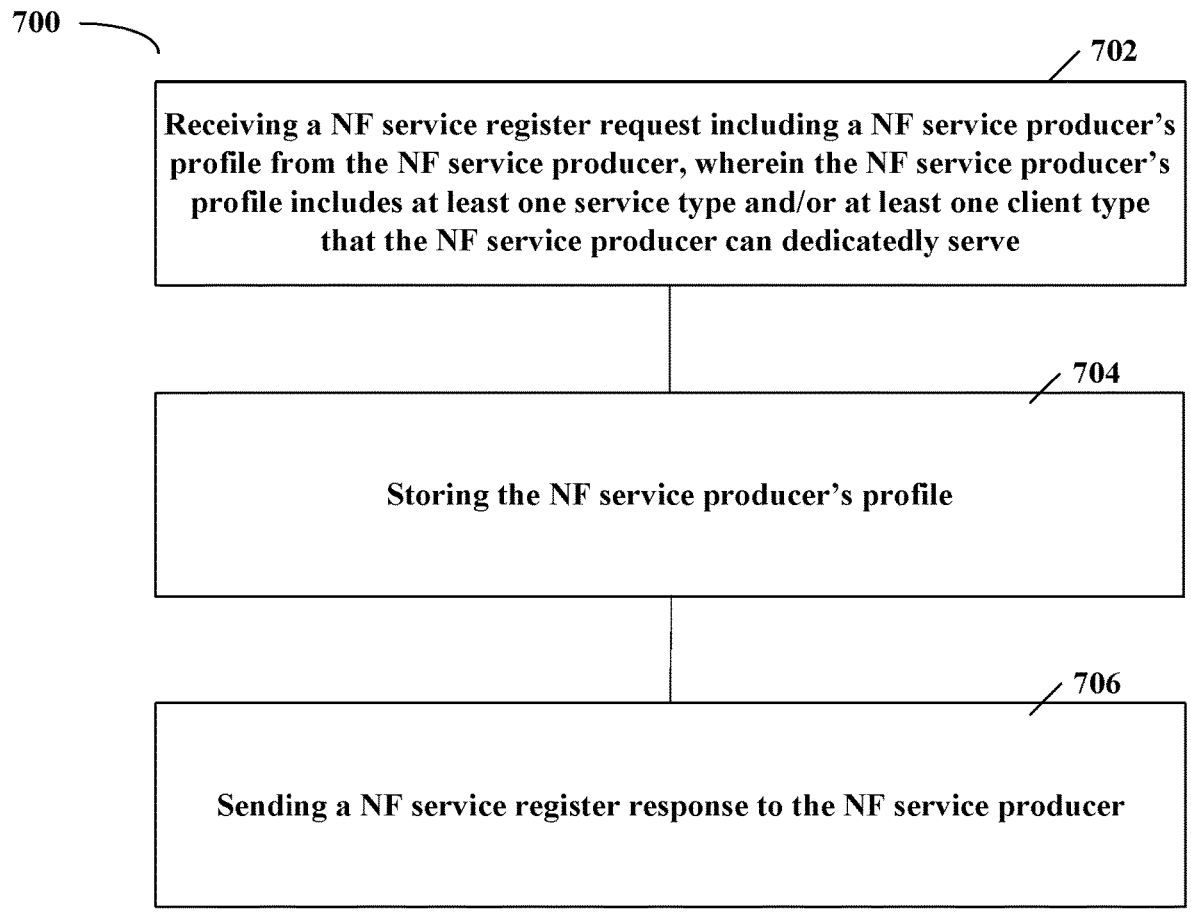
FIG. 7 shows a flowchart of a method according to another embodiment of the present disclosure.

FIG. 7 shows a flowchart of a method according to another embodiment of the present disclosure, which may be performed by an apparatus implemented in/at or communicatively coupled to a service discovery entity such as NRF or SCP. As such, the apparatus may provide means for accomplishing various parts of the method 700 as well as means for accomplishing other processes in conjunction with other components. For some parts which have been described in the above embodiments, detailed description thereof is omitted here for brevity.

At block 702, the service discovery entity receives a NF service register request including a NF service producer's profile from the NF service producer. The NF service producer's profile includes at least one service type and/or at least one client type that the NF service producer can dedicatedly serve. As described above the NF service register request may further include any other parameters. For example, the NF service register request may be Nnrf_NF-Management_NFRegister Request.

In generally, if an NF instance has registered with an indication that it dedicatedly serves for certain service type (s) and/or client type(s), the NRF or SCP will not return or select this NF instance in response to NF service discovery requests that do not include an indication for the certain service type (s) and/or client type(s) or include unmatched service type (s) and/or client type(s). Alternatively, the NRF or SCP may return or select this NF instance in response to NF service discovery requests that do not include an indication for the certain service type (s) and/or client type(s) or include unmatched service type (s) and/or client type(s) when only this NF instance can serve the NFs sending the NF service discovery requests, for example, other NF instances are not available.

At block 704, the service discovery entity stores the NF service producer's profile. In addition, the service discovery entity may mark the NF service producer available.

At block 706, the service discovery entity sends a NF service register response to the NF service producer. For example, the service discovery entity such as NRF may acknowledge NF Registration is accepted via Nnrf_NFManagement_NFRegister response.

Figure 8:
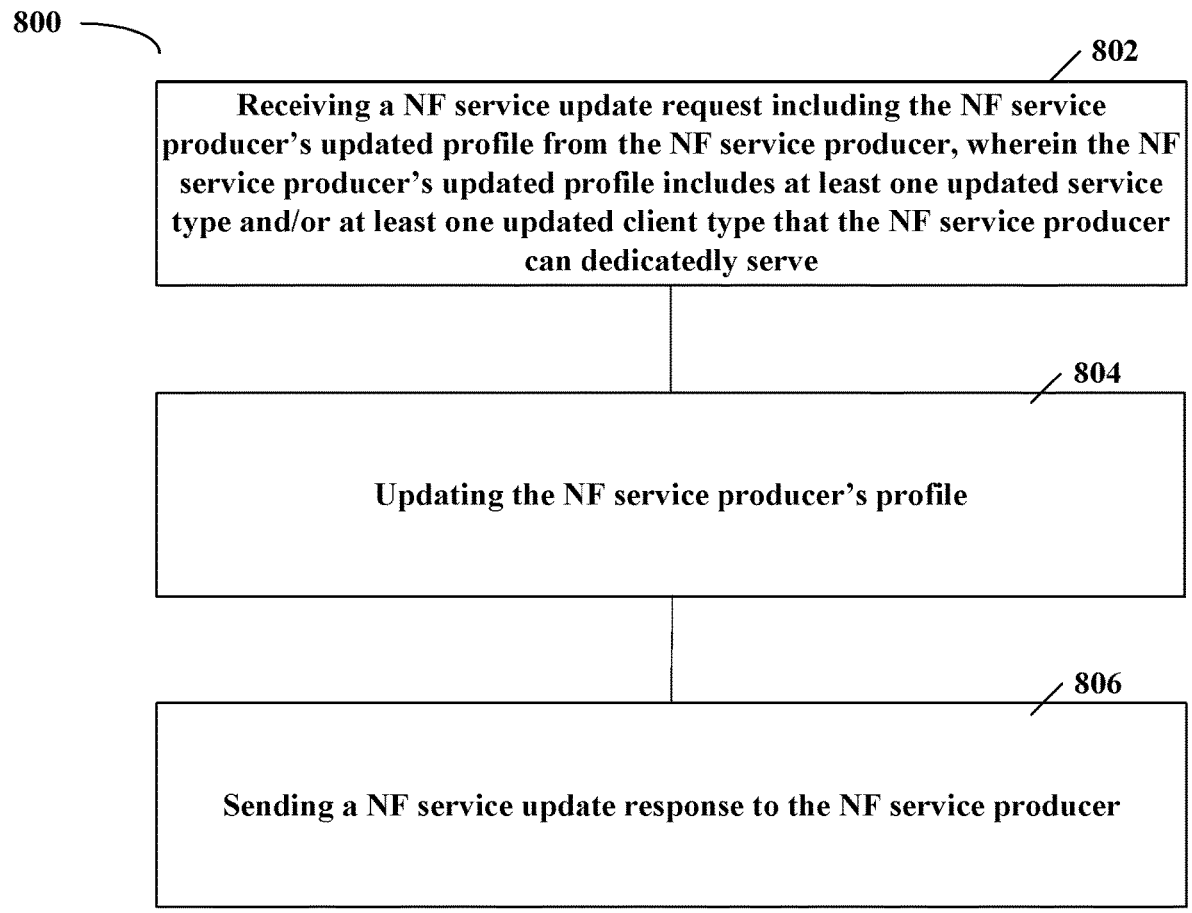
FIG. 8 shows a flowchart of a method according to another embodiment of the present disclosure.

FIG. 8 shows a flowchart of a method according to another embodiment of the present disclosure, which may be performed by an apparatus implemented in/at or communicatively coupled to a service discovery entity such as NRF or SCP. As such, the apparatus may provide means for accomplishing various parts of the method 800 as well as means for accomplishing other processes in conjunction with other components. For some parts which have been described in the above embodiments, detailed description thereof is omitted here for brevity. It is noted that the service discovery entity may first perform method 700 and then perform method 800. Alternatively, the service discovery entity may first perform a normal NF service register procedure (for example without at least one service type and/or at least one client type that the NF service producer can dedicatedly serve) for example as described in clause 4.17.1 of 3GPP TS 23.502 V16.1.1 and then perform the method 800.

At block 802, the service discovery entity receives a NE service update request including the NE service producer's updated profile from the NF service producer. The NF service producer's updated profile includes at least one updated service type and/or at least one updated client type that the NF service producer can dedicatedly serve. For example, the NF service update request may be Nnrf_NF-Management_NFUpdate Request.

At block 804, the service discovery entity updates the NF service producer's profile. For example, the service discovery entity may add and/or remove and/or modify at least one service type and/or at least one client type in the NF service producer's profile. In addition, the service discovery entity may update other parameters in the NF service producer's profile.

At block 806, the service discovery entity sends a NF service update response to the NF service producer. For example, the service discovery entity such as NRF may acknowledge NE update is accepted via Nnrf_NFManagement_NFUpdate response.

Figure 9:
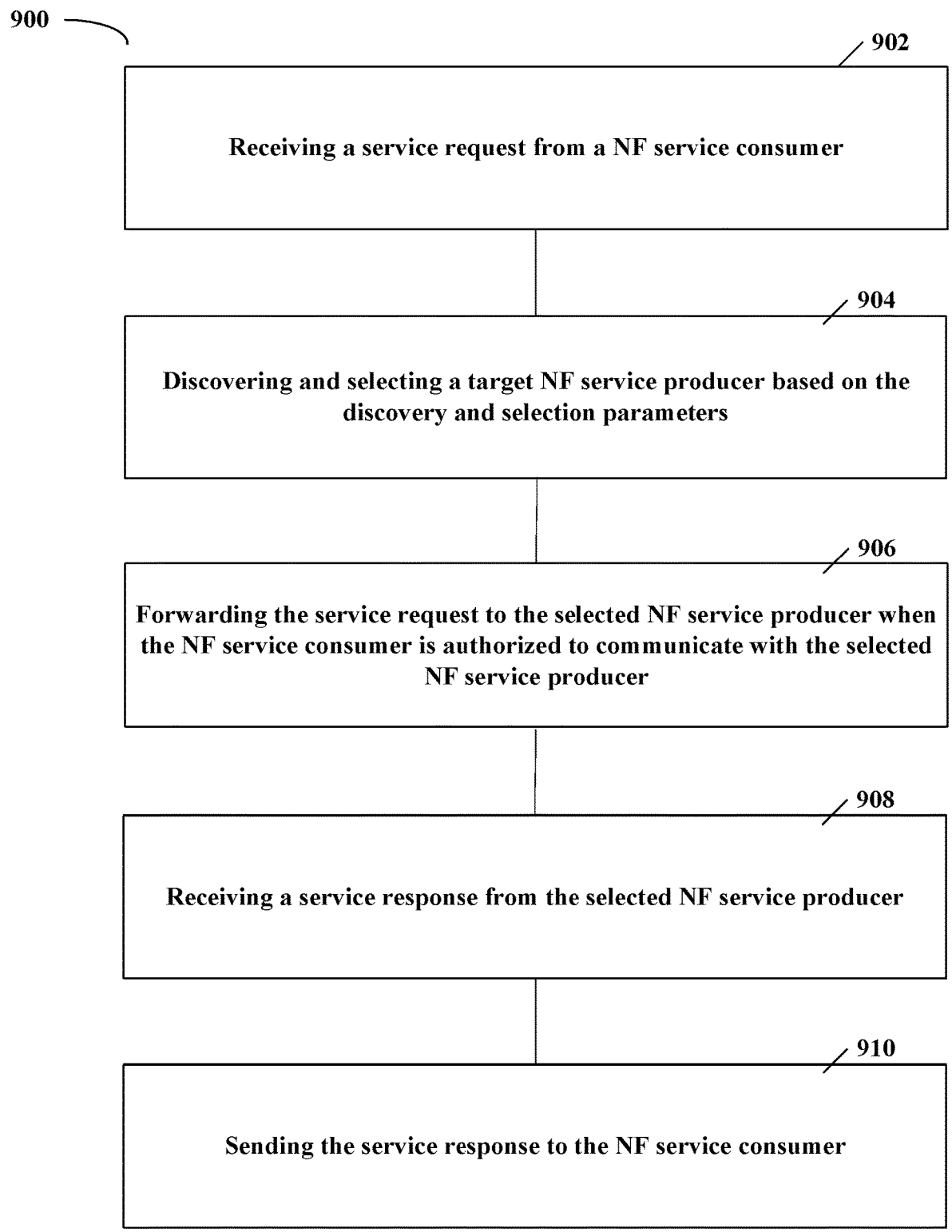
FIG. 9 shows a flowchart of a method according to another embodiment of the present disclosure.

FIG. 9 shows a flowchart of a method according to another embodiment of the present disclosure, which may be performed by an apparatus implemented in/at or communicatively coupled to a service discovery entity such as NRF or SCP. As such, the apparatus may provide means for accomplishing various parts of the method 900 as well as means for accomplishing other processes in conjunction with other components. For some parts which have been described in the above embodiments, detailed description thereof is omitted here for brevity. In this embodiment, the service discovery entity is a SCP and the parameter is used as one of discovery and selection parameters.

At block 902, the service discovery entity such as SCP receives a service request from a NF service consumer. The service request includes a parameter indicating a service type and/or a client type that one or more candidate target NFs can serve. Block 902 is similar to block 602.

At block 904, the service discovery entity such as SCP discovers and selects a target NE service producer based on the discovery and selection parameters. For example, the service discovery entity may perform discovery upon the service request including the parameter indicating a service type and/or a client type that one or more candidate target NFs can serve either by interacting with an NRF using Nnrf_NFDiscovery service or may use information collected during the previous interactions with an NRF (by the Nnrf_NFDiscovery service or Nnrf_NFManagement_NF-StatusNotify service operation). The service discovery entity together with the NRF may authorize the service request. The service discovery entity may try to select the target NF service producer matching the service request. Otherwise, the SCP may select other service producer.

At block 906, the service discovery entity forwards the service request to the selected NF service producer when the NF service consumer is authorized to communicate with the selected NF service producer.

At block 908, the service discovery entity receives a service response from the selected NF service producer. If the service request creates a resource in the NF service producer, the NF service producer may respond with a resource address identifying the created resource.

At block 910, the service discovery entity sends the service response to the NF service consumer. For example, the service discovery entity may route the service response received from the selected NF service producer to the NF service consumer.

Figure 10:
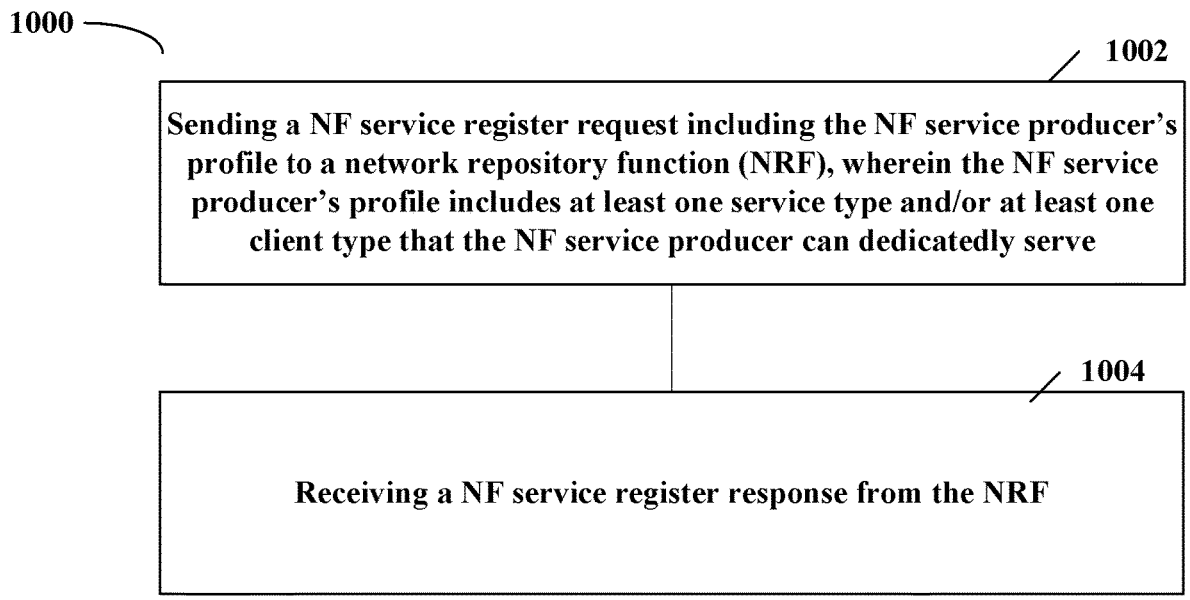
FIG. 10 shows a flowchart of a method according to another embodiment of the present disclosure.

FIG. 10 shows a flowchart of a method according to another embodiment of the present disclosure, which may be performed by an apparatus implemented in/at or communicatively coupled to a NF service producer. As such, the apparatus may provide means for accomplishing various parts of the method 1000 as well as means for accomplishing other processes in conjunction with other components. For some parts which have been described in the above embodiments, detailed description thereof is omitted here for brevity.

At block 1002, the NF service producer sends a NF service register request including the NF service producer's profile to a NRF. The NF service producer's profile includes at least one service type and/or at least one client type that the NF service producer can dedicatedly serve. The NF service register request may be similar to the NF service register request as described above.

At block 1004, the NF service producer receives a NF service register response from the NRF. The NF service register response may be similar to the NF service register response as described above.

Figure 11:
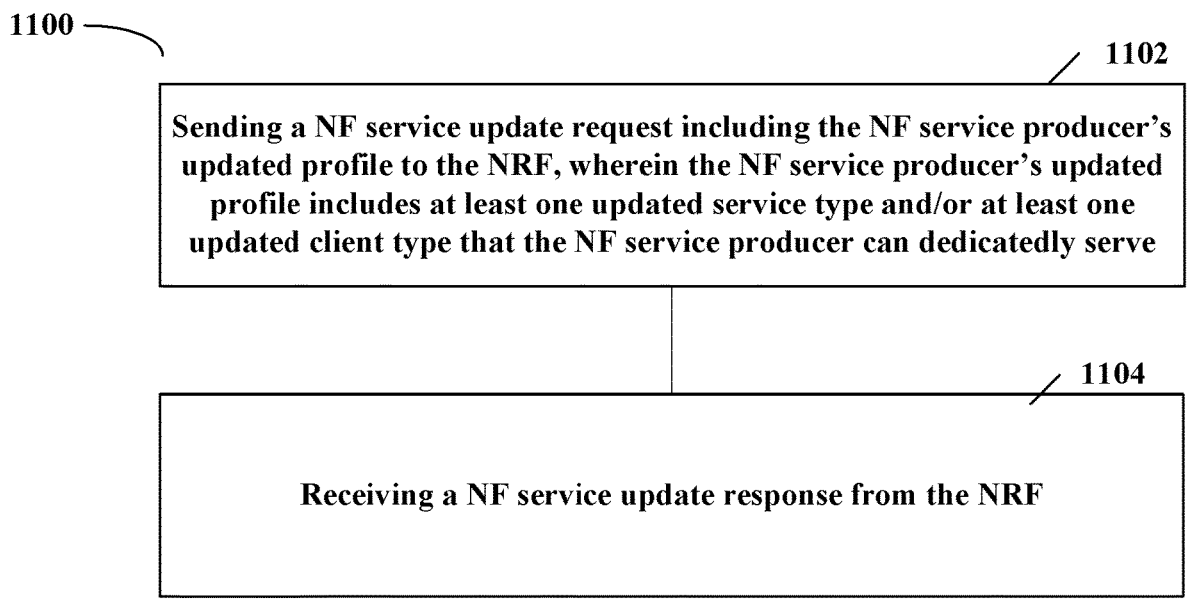
FIG. 11 shows a flowchart of a method according to another embodiment of the present disclosure.

FIG. 11 shows a flowchart of a method according to another embodiment of the present disclosure, which may be performed by an apparatus implemented in/at or communicatively coupled to a NF service producer. As such, the apparatus may provide means for accomplishing various parts of the method 1100 as well as means for accomplishing other processes in conjunction with other components. For some parts which have been described in the above embodiments, detailed description thereof is omitted here for brevity.

At block 1102, the NF service producer sends a NF service update request including the NF service producer's updated profile to the NRF. The NF service producer's updated profile includes at least one updated service type and/or at least one updated client type that the NF service producer can dedicatedly serve. The NF service update request may be similar to the NF service update request as described above.

At block 1104, the NF service producer receives a NF service register response from the NRF. The NF service update response may be similar to the NF service update response as described above.

Figure 12:
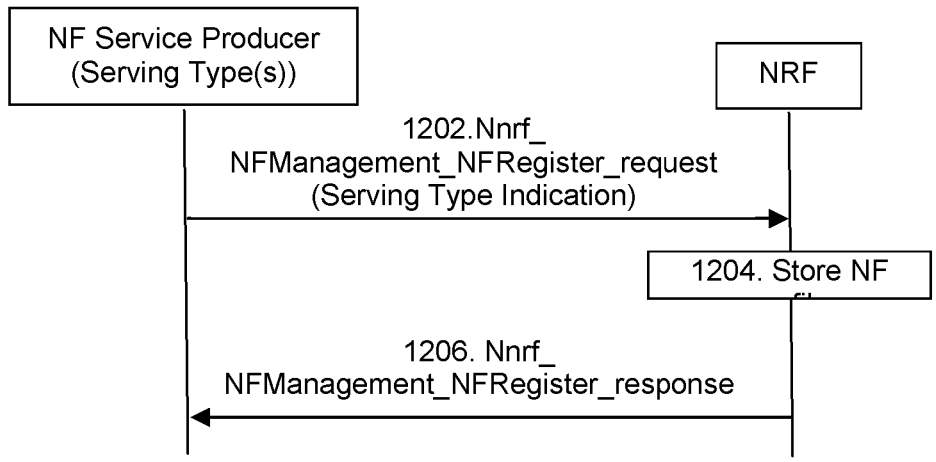
FIG. 12 shows a flowchart of a method according to another embodiment of the present disclosure.

FIG. 12 shows a flowchart of a method according to another embodiment of the present disclosure. When an NF service producer is provisioned with certain serving type(s) (i.e., service type and/or client type), it may carry an indication indicating its serving type(s) in a NF service registration request such as Nnrf_NFManagement_NFRegister Request to NRF at step 1202. The NRF shall store the NF profile of the NF service producer in the service registration request including the indication and mark the NF service producer available at step 1204. At step 1206, NRF may send a service registration request response such as Nnrf_NFManagement_NFRegister response to the NF service producer. In subsequent NF service update procedure, the NF service producer may update the indication (e.g. add and/or remove and/or modify the serving type(s)), when its configuration for the serving type(s) is changed. As an example, the serving types may include "EMERGENCY_SERVICES",
"VALUE_ADDED_SERVICES",
"PLMN_OPERATOR_SERVICES",
"LAWFUL_INTERCEPT_SERVICES",
"PLMN_OPERATOR_BROADCAST_SERVICES",
"PLMN_OPERATOR_OM",
"PLMN_OPERATOR_ANONYMOUS_STATISTICS",
"PLMN_OPERATOR_TARGET_MS_SERVICE_SUPPORT", as described in 3GPP TS 29.572 V15.4.0.

Figure 13:
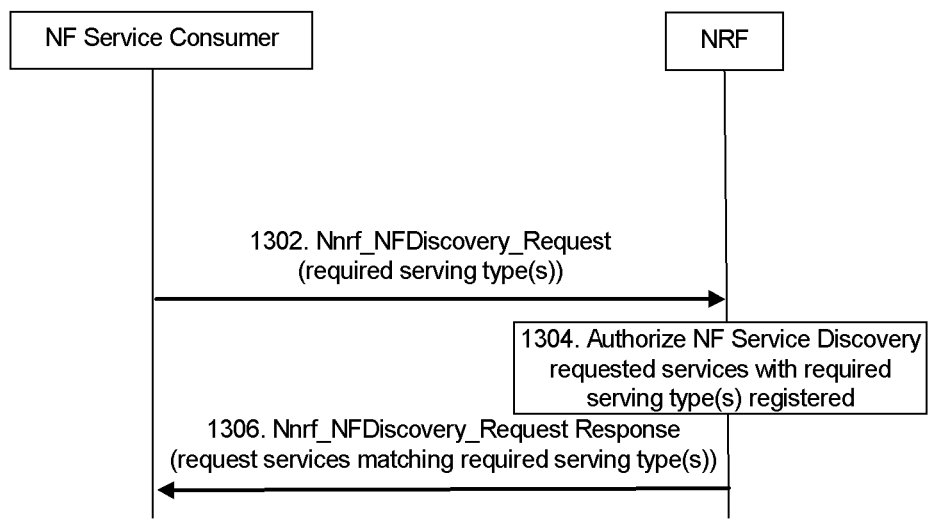
FIG. 13 shows a flowchart of a method according to another embodiment of the present disclosure.

FIG. 13 shows a flowchart of a method according to another embodiment of the present disclosure. When an NF service consumer wants to discover NF service producer(s) for certain NF serving type(s), it can pass an indication indicating the required serving type(s) in a service discovery request such as Nnrf_NFDiscovery_Request to NRF at step 1302. When receiving the service discovery request including the indication, the NRF authorizes the service discovery request at step 1304. For example, based on the profile of the expected NF/NF service and the type of the NF service consumer, the NRF determines whether the NF service consumer is allowed to discover the expected NF instance(s). If the expected NF instance(s) or NF service instance(s) are deployed in a certain network slice, NRF authorizes the discovery request according to the discovery configuration of the network slice, e.g. the expected NF instance(s) are only discoverable by the NF in the same network slice. At step 1306, if the NF service consumer is allowed to discover the expected NF instance(s), the NRF may match the registered NF service producer instances with the desired serving type(s). If any matched, the NRF shall return information of the request service instances(s) supporting one or more requested serving type(s). Otherwise, the NRF may select other NF service producers and return them to the NF service consumer.

Figure 14:
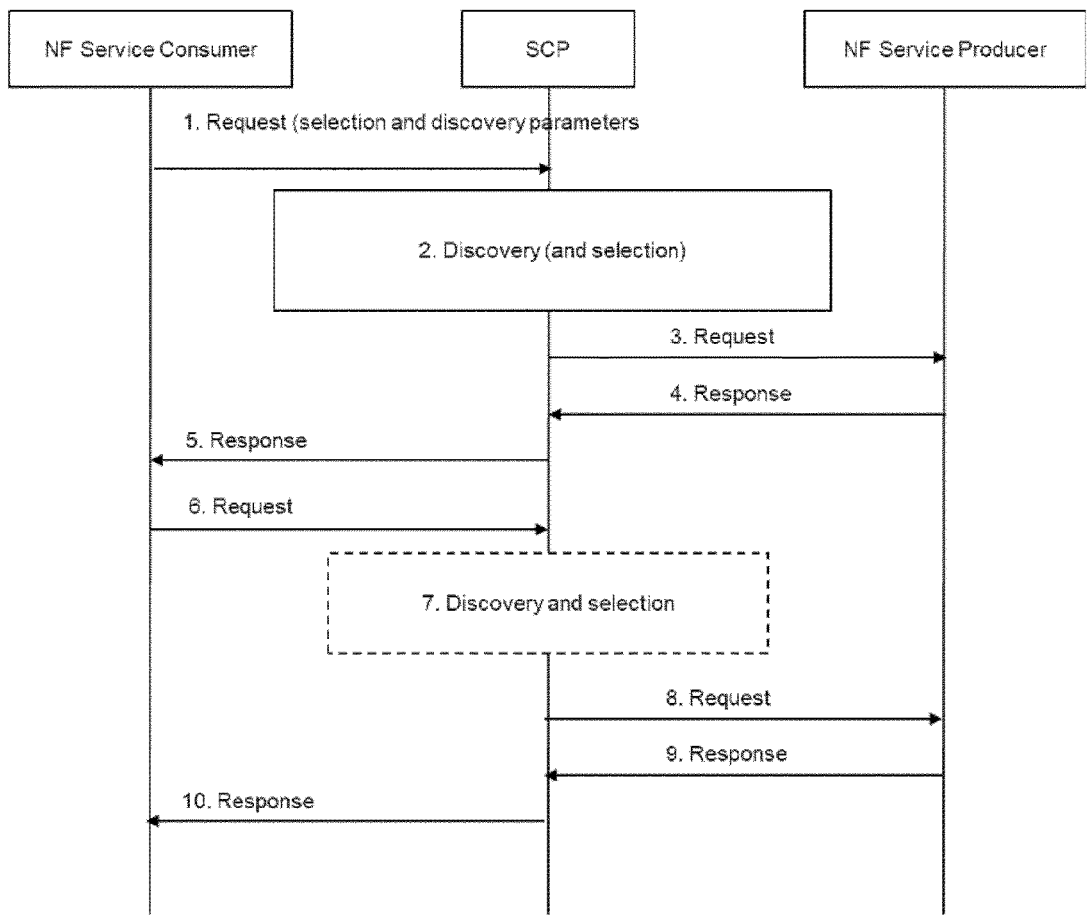
FIG. 14 shows a flowchart of a method according to another embodiment of the present disclosure.

FIG. 14 shows a flowchart of a method according to another embodiment of the present disclosure. When an NF service consumer is going to invoke a service operation for certain serving type, it may pass an indication indicating the required serving type in the selection and discovery parameters carried in the service request to the SCP at step 1. When receiving the indication in the service request, the SCP may try to select a NF service producer supporting required serving type at step 2. If any match, the SCP may relay the service request to the selected NF servicer producer supporting required serving type at step 3. Otherwise, the SCP may select other service producer and relay the service request. The other steps as shown in FIG. 14 are similar to the corresponding steps of clause 4.17.9 of 3GPP TS 23.502 V16.1.1.

Figure 15:
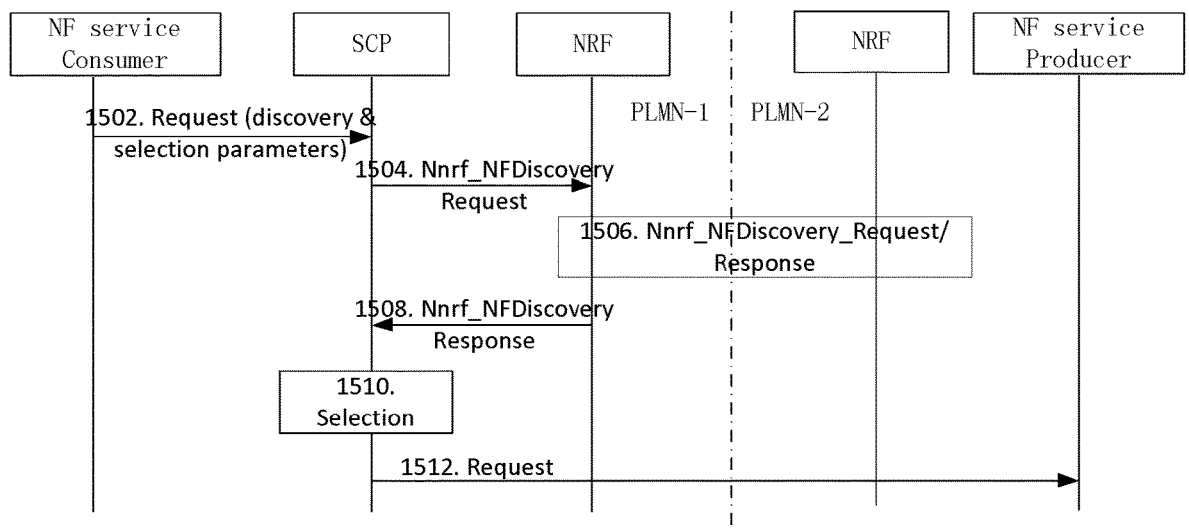
FIG. 15 shows a flowchart of a method according to another embodiment of the present disclosure.

FIG. 15 shows a flowchart of a method according to another embodiment of the present disclosure. The steps as shown in FIG. 15 are similar to the corresponding steps of clause 4.17.10 of 3GPP TS 23.502 V16.1.1 except that the requests at steps 1502, 1504, 1506 include a parameter indicating a service type and/or a client type that one or more candidate target NFs can serve. NRF may try to match the registered NF service producer instances with the desired service type and/or client type and SCP may try to select a NF service producer supporting required service type and/or client type.

In an embodiment, reason for change of 3GPP TS 29.510 V16.0.0 may be as following.

In telecom network, it is a common practice to deploy certain Network Entity(-ies) (NEs) to serve certain purposes, e.g. specific Gateway Mobile Location Centre(s) (GMLC(s)) deployed in operator network dedicated only for emergency, dedicated GMLC to handle high volume "Value Added Service" traffic to avoid impacts to normal users, etc.

Example. 3GPP TS 23.273 has Specified Following Client Types:

| | | |
|---|---|---|
| LCS(LoCation Services) Client Type | M | Identifies the type of LCS client from among the following: Emergency Services Value Added Services PLMN Operator Services Lawful Intercept Services |

Example. 3GPP TS 29.572 has Specified Following Client Types:
- "EMERGENCY_SERVICES"
- "VALUE_ADDED_SERVICES"
- "PLMN_OPERATOR_SERVICES"
- "LAWFUL_INTERCEPT_SERVICES"
- "PLMN_OPERATOR_BROADCAST_SERVICES"
- "PLMN_OPERATOR_OM"
- "PLMN_OPERATOR_ANONYMOUS_STATISTICS"
- "PLMN_OPERATOR_TARGET_MS_SERVICE_SUPPORT"

In order to access the network entities serving specific purpose, in legacy network the information of these network entities is pre-configured in peer nodes, e.g. E-SMLC is configured in MME for emergency positioning. When receiving a location request from certain client type, the MME will use specific configured SMLC for location service.

In 5G SBA architecture, Services are registered and discovered dynamically instead of pre-configured. In order to support the GMLC/LMF deployment for dedicated serving client types, the GMLC/LMF should register the client types the can serve in the NF profile and NF service consumer (e.g. AMF) should be able to discover the GMLC/LMF instances that can serve the desired client type(s).

In an embodiment, summary of change of 3GPP TS 29.510 V16.0.0 may be as following.
/1. Define new data type LmfInfo and GmlcInfo, including an attribute indicating the dedicatedly serving client types of the NF.
/2. Add new attribute "lmfInfo" and "gmlcInfo" in NFProfile
/3. Add new query parameter "client-type" indicating the requested client type for discovery
/4. Update OpenAPI files accordingly In an embodiment, consequences if not approved of change of 3GPP TS 29.510 V16.0.0 may be as following. NF instance dedicatedly serving specific client type cannot be supported, location service for emergency may be impacted by other traffics.

In an embodiment, Table 6.1.6.1-1 (Nnrf_NFManagement specific Data Types) of 3GPP TS 29.510 V16.0.0 may be amended as the following.

| Data type | Section defined | Description |
|---|---|---|
| NFProfile | 6.1.6.2.2 | |
| NFService | 6.1.6.2.3 | |
| DefaultNotificationSubscription | 6.1.6.2.4 | Data structure for specifying the notifications the NF service subscribes by default along with callback URI. |
| IpEndPoint | 6.1.6.2.5 | |
| UdrInfo | 6.1.6.2.6 | |
| UdmInfo | 6.1.6.2.7 | |
| AusfInfo | 6.1.6.2.8 | |
| SupiRange | 6.1.6.2.9 | |
| IdentityRange | 6.1.6.2.10 | |
| AmfInfo | 6.1.6.2.11 | |
| SmfInfo | 6.1.6.2.12 | |
| UpfInfo | 6.1.6.2.13 | Information related to UPF |
| SnssaiUpfInfoItem | 6.1.6.2.14 | |
| DnnUpfInfoItem | 6.1.6.2.15 | |
| SubscriptionData | 6.1.6.2.16 | |
| NotificationData | 6.1.6.2.17 | |
| NFServiceVersion | 6.1.6.2.19 | Contains the version details of an NF service. |
| PcfInfo | 6.1.6.2.20 | |
| BsfInfo | 6.1.6.2.21 | |
| Ipv4AddressRange | 6.1.6.2.22 | |
| Ipv6PrefixRange | 6.1.6.2.23 | |
| InterfaceUpfInfoItem | 6.1.6.2.24 | |
| UriList | 6.1.6.2.25 | |
| N2InterfaceAmfInfo | 6.1.6.2.26 | AMF N2 interface information |
| TaiRange | 6.1.6.2.27 | |
| TacRange | 6.1.6.2 28 | |
| SnssaiSmfInfoItem | 6.1.6.2.29 | |
| DnnSmfInfoItem | 6.1.6.2.30 | |
| NrfInfo | 6.1.6.2.31 | |
| ChfInfo | 6.1.6.2.32 | |
| ChfServiceInfo | 6.1.6.2.33 | |
| PlmnRange | 6.1.6.2.34 | |
| SubscrCond | 6.1.6.2.35 | |
| NfInstanceIdCond | 6.1.6.2.36 | |
| NfTypeCond | 6.1.6.2.37 | |
| ServiceNameCond | 6.1.6.2.38 | |
| AmfCond | 6.1.6.2.39 | |
| GuamiListCond | 6.1.6.2.40 | |
| NetworkSliceCond | 6.1.6.2.41 | |
| NfGroupCond | 6.1.6.2.42 | |
| NotifCondition | 6.1.6.2.43 | |
| PlmnSnssai | 6.1.6.2.44 | |
| NwdafInfo | 6.1.6.2.45 | |
| LmfInfo | 6.1.6.2.x | |

-continued

| Data type | Section defined | Description |
|---|---|---|
| GmlcInfo | 6.1.6.2.y | |
| Fqdn | 6.1.6.3.2 | |
| NFType | 6.1.6.3.3 | |
| NotificationType | 6.1.6.3.4 | |
| TransportProtocol | 6.1.6.3.5 | |
| NotificationEventType | 6.1.6.3.6 | |
| NFStatus | 6.1.6.3.7 | |
| DataSetId | 6.1.6.3.8 | |
| UPInterfaceType | 6.1.6.3.9 | |
| ServiceName | 6.1.6.3.11 | |
| NFServiceStatus | 6.1.6.3.12 | |

In an embodiment, Table 6.1.6.1-2 (Nnrf_NFManagement re-used Data Types) of 3GPP TS 29.510 V16.0.0 may be amended as the following.

| Data type | Reference | Comments |
|---|---|---|
| N1MessageClass | 3GPP TS 29.518 [6] | The N1 message type |
| N2InformationClass | 3GPP TS 29.518 [6] | The N2 information type |
| IPv4Addr | 3GPP TS 29.571 [7] | |
| IPv6Addr | 3GPP TS 29.571 [7] | |
| IPv6Prefix | 3GPP TS 29.571 [7] | |
| Uri | 3GPP TS 29.571 [7] | |
| Dnn | 3GPP TS 29.571 [7] | |
| SupportedFeatures | 3GPP TS 29.571 [7] | |
| Snssai | 3GPP TS 29.571 [7] | |
| PlmnId | 3GPP TS 29.571 [7] | |
| Guami | 3GPP TS 29.571 [7] | |
| Tai | 3GPP TS 29.571 [7] | |
| NfInstanceId | 3GPP TS 29.571 [7] | |
| LinksValueSchema | 3GPP TS 29.571 [7] | 3GPP Hypermedia link |
| UriScheme | 3GPP TS 29.571 [7] | |
| AmfName | 3GPP TS 29.571 [7] | |
| DateTime | 3GPP TS 29.571 [7] | |
| Dnai | 3GPP TS 29.571 [7] | |
| ChangeItem | 3GPP TS 29.571 [7] | |
| DiameterIdentity | 3GPP TS 29.571 [7] | |
| AccessType | 3GPP TS 29.571 [7] | |
| NfGroupId | 3GPP TS 29.571 [7] | Network Function Group Id |
| AmfRegionId | 3GPP TS 29.571 [7] | |
| AmfSetId | 3GPP TS 29.571 [7] | |
| PduSessionType | 3GPP TS 29.571 [7] | |
| AtsssCapability | 3GPP TS 29.571 [7] | Capability to support procedures related to Access Traffic Steering, Switching, Splitting. |
| EventId | 3GPP TS 29.520 [32] | Defined in Nnwdaf_AnalyticsInfo API. |
| NwdafEvent | 3GPP TS 29.520 [32] | Defined in Nnwdaf_Events-Subscription API. |
| ExternalClientType | 3GPP TS 29.572 [xx] | |

In an embodiment, Table 6.1.6.2-2 (Definition of type NFProfile) of 3GPP TS 29.510 V16.0.0 may be added the following contents.

| Attribute name | Data type | P | Cardinality | Description |
|---|---|---|---|---|
| lmfInfo | LmfInfo | O | 0 . . . 1 | Specific data for the LMF |
| gmlcInfo | GmlcInfo | O | 0 . . . 1 | Specific data for the GMLC |

In an embodiment, a new Table 6.1.6.2.x-1: Definition of type LmfInfo may be added in 3GPP TS 29.510 V16.0.0. "x" means any suitable number.

TABLE 6.1.6.2.x-1

Definition of type LmfInfo

| Attribute name | Data type | P | Cardinality | Description |
|---|---|---|---|---|
| servingClientTypes | array(ExternalClientType) | C | 1 . . . N | This IE shall be present if the LMF is dedicated to serve the listed external client type(s), e.g. emergency client. The NRF should only include this LMF instance to NF discovery with "client-type" query parameter indicating one of the external client types in the list. Absence of this IE means the LMF is not dedicated to serve specific client types. |

In an embodiment, a new Table 6.1.6.2.y-1: Definition of type GmlcInfo may be added in 3GPP TS 29.510 V16.0.0. "y" means any suitable number.

TABLE 6.1.6.2.y-1:

| | Definition of type GmlcInfo | | | |
|---|---|---|---|---|
| Attribute name | Data type | P | Cardinality | Description |
| servingClientTypes | array(ExternalClientType) | C | 1 ... N | This IE shall be present if the GMLC is dedicated to serve the listed external client type(s), e.g. emergency client. The NRF should only include this GMLC instance to NF discovery with "client-type" query parameter indicating one of the external client types in the list. Absence of this IE means the GMLC is not dedicated to serve specific client types. |

In an embodiment, Table 6.2.3.2.3.1-1 (URI query parameters supported by the GET method on this resource) of 3GPP TS 29.510 V16.0.0 may be added the following contents.

| Name | Data type | P | Cardinality | Description | Applicability |
|---|---|---|---|---|---|
| client-type | ExternalClientType | O | 0 ... 1 | When present, this IE indicates that NF(s) dedicatedly serving the specified Client Type needs to be discovered. This IE may be included when target NF Type is "LMF" and "GMLC". If no NF profile is found dedicately serving the requested client type, the NRF may return NF(s) not dedicatedly serving the request client type in the response. | Query-Params-Ext 2 |

In an embodiment, Table 6.2.6.1-2: Nnrf_NFDiscovery re-used Data Types of 3GPP TS 29.510 V16.0.0 may be added the following contents.

| Data type | Reference | Comments |
|---|---|---|
| LmfInfo | 3GPP TS 29.510 | See clause 6.1.6.2.x |
| GmlcInfo | 3GPP TS 29.510 | See clause 6.1.6.2.y |

In an embodiment, Table 6.2.6.2.3-1: Definition of type NFProfile of 3GPP TS 29.510 V16.0.0 may be added the following contents.

| Attribute name | Data type | P | Cardinality | Description |
|---|---|---|---|---|
| lmfInfo | LmfInfo | O | 0 ... 1 | Specific data for the LMF |
| gmlcInfo | GmlcInfo | O | 0 ... 1 | Specific data for the GMLC |

In an embodiment, the following API (Application Program Interface) of 3GPP TS 29.510 V16.0.0 may be amended as following.

A.2 Nnrf_NFManagement API

```
openapi: 3.0.0
info:
  version: '1.1.0.alpha-1'
  title: 'NRF NFManagement Service'
  description: |
    NRF NFManagement Service.
    © 2019, 3GPP Organizational Partners (ARIB, ATIS, CCSA, ETSI, TSDSI, TTA, TTC).
    All rights reserved.
```

********************* Text Skipped for Clarify *********************

```
schemas:
  NFProfile:
    type: object
    required:
      - nfInstanceId
      - nfType
      - nfStatus
    anyOf:
      - required: [ fqdn ]
      - required: [ ipv4Addresses ]
      - required: [ ipv6Addresses ]
    properties:
      nfInstanceId:
        $ref: 'TS29571_CommonData.yaml#/components/schemas/NfInstanceId'
      nfInstanceName:
        type: string
      nfType:
        $ref: '#/components/schemas/NFType'
      nfStatus:
        $ref: '#/components/schemas/NFStatus'
      heartBeatTimer:
        type: integer
      plmnList:
        type: array
        items:
          $ref: 'TS29571_CommonData.yaml#/components/schemas/PlmnId'
        minItems: 1
      sNssais:
        type: array
        items:
          $ref: 'TS29571_CommonData.yaml#/components/schemas/Snssai'
        minItems: 1
      perPlmnSnssaiList:
        type: array
        items:
          $ref: '#/components/schemas/PlmnSnssai'
        minItems: 1
      nsiList:
        type: array
        items:
          type: string
        minItems: 1
      fqdn:
        $ref: '#/components/schemas/Fqdn'
      interPlmnFqdn:
        $ref: '#/components/schemas/Fqdn'
      ipv4Addresses:
        type: array
        items:
          $ref: 'TS29571_CommonData.yaml#/components/schemas/Ipv4Addr'
        minItems: 1
      ipv6Addresses:
        type: array
        items:
          $ref: 'TS29571_CommonData.yaml#/components/schemas/Ipv6Addr'
        minItems: 1
      allowedPlmns:
        type: array
        items:
          $ref: 'TS29571_CommonData.yaml#/components/schemas/PlmnId'
        minItems: 1
      allowedNfTypes:
        type: array
        items:
          $ref: '#/components/schemas/NFType'
        minItems: 1
      allowedNfDomains:
        type: array
        items:
          type: string
        minItems: 1
      allowedNssais:
        type: array
        items:
          $ref: 'TS29571_CommonData.yaml#/components/schemas/Snssai'
        minItems: 1
      priority:
        type: integer
        minimum: 0
```

```
    maximum: 65535
capacity:
  type: integer
  minimum: 0
  maximum: 65535
load:
  type: integer
  minimum: 0
  maximum: 100
locality:
  type: string
udrInfo:
  $ref: '#/components/schemas/UdrInfo'
udrInfoExt:
  type: array
  items:
    $ref: '#/components/schemas/UdrInfo'
  minItems: 1
udmInfo:
  $ref: '#/components/schemas/UdmInfo'
udmInfoExt:
  type: array
  items:
    $ref: '#/components/schemas/UdmInfo'
  minItems: 1
ausfInfo:
  $ref: '#/components/schemas/AusfInfo'
ausfInfoExt:
  type: array
  items:
    $ref: '#/components/schemas/AusfInfo'
  minItems: 1
amfInfo:
  $ref: '#/components/schemas/AmfInfo'
amfInfoExt:
  type: array
  items:
    $ref: '#/components/schemas/AmfInfo'
  minItems: 1
smfInfo:
  $ref: '#/components/schemas/SmfInfo'
smfInfoExt:
  type: array
  items:
    $ref: '#/components/schemas/SmfInfo'
  minItems: 1
upfInfo:
  $ref: '#/components/schemas/UpfInfo'
upfInfoExt:
  type: array
  items:
    $ref: '#/components/schemas/UpfInfo'
  minItems: 1
pcfInfo:
  $ref: '#/components/schemas/PcfInfo'
pcfInfoExt:
  type: array
  items:
    $ref: '#/components/schemas/PcfInfo'
  minItems: 1
bsfInfo:
  $ref: '#/components/schemas/BsfInfo'
bsfInfoExt:
  type: array
  items:
    $ref: '#/components/schemas/BsfInfo'
  minItems: 1
chfInfo:
  $ref: '#/components/schemas/ChfInfo'
chfInfoExt:
  type: array
  items:
    $ref: '#/components/schemas/ChfInfo'
  minItems: 1
nrfInfo:
  $ref: '#/components/schemas/NrfInfo'
nwdafInfo:
  $ref: '#/components/schemas/NwdafInfo'
customInfo:
  type: object
```

```
    recoveryTime:
      $ref: 'TS29571_CommonData.yaml#/components/schemas/DateTime'
    nfServicePersistence:
      type: boolean
      default: false
    nfServices:
      type: array
      items:
        $ref: '#/components/schemas/NFService'
      minItems: 1
    nfProfileChangesSupportInd:
      type: boolean
      default: false
      writeOnly: true
    nfProfileChangesInd:
      type: boolean
      default: false
      readOnly: true
    defaultNotificationSubscriptions:
      type: array
      items:
        $ref: '#/components/schemas/DefaultNotificationSubscription'
    lmfInfo:
      $ref: '#/components/schemas/LmfInfo'
    gmlcInfo:
      $ref: '#/components/schemas/GmlcInfo'
NFService:
  type: object
  required:
    - serviceInstanceId
    - serviceName
    - versions
    - scheme
    - nfServiceStatus
```

********************** Text Skipped for Clarify **********************

```
Nwdafinfo:
  type: object
  properties:
    eventIds:
      type: array
      items:
        $ref: 'TS29520_Nnwdaf_AnalyticsInfo.yaml#/components/schemas/EventId'
      minItems: 1
    nwdafEvents:
      type: array
      items:
        $ref: 'TS29520_Nnwdaf_EventsSubscription.yaml#/components/schemas/NwdafEvent'
      minItems: 1
    taiList:
      type: array
      items:
        $ref: 'TS29571_CommonData.yaml#/components/schemas/Tai'
      minItems: 1
    taiRangeList:
      type: array
      items:
        $ref: '#/components/schemas/TaiRange'
      minItems: 1
LmfInfo:
  type: object
  properties:
    servingClientTypes:
      type: array
      items:
        $ref: 'TS29572_Nlmf_Location.yaml#/components/schemas/ExternalClientType'
      minItems: 1
GmlcInfo:
  type: object
  properties:
    servingClientTypes:
      type: array
      items:
        $ref: 'TS29572_Nlmf_Location.yaml#/components/schemas/ExternalClientType'
      minItems: 1 externalDocs:
  description: 3GPP TS 29.510 V16.0.0; 5G System; Network Function Repository Services; Stage 3
```

```
url: 'http://www.3gpp.org/ftp/Specs/archive/29_series/29.510/'
```

A.3  Nnrf_NFDiscovery API

```
openapi: 3.0.0
info:
  version: '1.1.0.alpha-1'
  title: 'NRF NFDiscovery Service'
  description: |
    NRF NFDiscovery Service.
    © 2019, 3GPP Organizational Partners (ARIB, ATIS, CCSA, ETSI, TSDSI, TTA, TTC).
    All rights reserved.
servers:
  - url: '{apiRoot}/nnrf-disc/v1'
    variables:
      apiRoot:
        default: https://example.com
        description: apiRoot as defined in clause 4.4 of 3GPP TS 29.501
security:
  - {}
  - oAuth2ClientCredentials:
    - nnrf-disc
paths:
  /nf-instances:
    get:
      summary: Search a collection of NF Instances
      operationId: SearchNFInstances
      tags:
        - NF Instances (Store)
      parameters:
        - name: target-nf-type
          in: query
          description: Type of the target NF
          required: true
          schema:
            $ref: 'TS29510_Nnrf_NFManagement.yaml#/components/schemas/NFType'
        - name: requester-nf-type
          in: query
          description: Type of the requester NF
          required: true
          schema:
            $ref: 'TS29510_Nnrf_NFManagement.yaml#/components/schemas/NFType'
        - name: requester-nf-instance-id
          in: query
          description: NfInstanceId of the requester NF
          schema:
            $ref: 'TS29571_CommonData.yaml#/components/schemas/NfInstanceId'
        - name: service-names
          in: query
          description: Names of the services offered by the NF
          schema:
            type: array
            items:
              $ref: 'TS29510_Nnrf_NFManagement.yaml#/components/schemas/ServiceName'
            minItems: 1
            uniqueItems: true
          style: form
          explode: false
        - name: requester-nf-instance-fqdn
          in: query
          description: FQDN of the requester NF
          schema:
            $ref: 'TS29510_Nnrf_NFManagement.yaml#/components/schemas/Fqdn'
        - name: target-plmn-list
          in: query
          description: Id of the PLMN of the target NF
          content:
            application/json:
              schema:
                type: array
                items:
                  $ref: 'TS29571_CommonData.yaml#/components/schemas/PlmnId'
                minItems: 1
        - name: requester-plmn-list
          in: query
```

```
    description: Id of the PLMN where the NF issuing the Discovery request is located
    content:
      application/json:
        schema:
          type: array
          items:
            $ref: 'TS29571_CommonData.yaml#/components/schemas/PlmnId'
          minItems: 1
- name: target-nf-instance-id
  in: query
  description: Identity of the NF instance being discovered
  schema:
    $ref: 'TS29571_CommonData.yaml#/components/schemas/NfInstanceId'
- name: target-nf-fqdn
  in: query
  description: FQDN of the NF instance being discovered
  schema:
    $ref: 'TS29510_Nnrf_NFManagement.yaml#/components/schemas/Fqdn'
- name: hnrf-uri
  in: query
  description: Uri of the home NRF
  schema:
    $ref: 'TS29571_CommonData.yaml#/components/schemas/Uri'
- name: snssais
  in: query
  description: Slice info of the target NF
  content:
    application/json:
      schema:
        type: array
        items:
          $ref: 'TS29571_CommonData.yaml#/components/schemas/Snssai'
        minItems: 1
- name: requester-snssais
  in: query
  description: Slice info of the requester NF
  content:
    application/json:
      schema:
        type: array
        items:
          $ref: 'TS29571_CommonData.yaml#/components/schemas/Snssai'
        minItems: 1
- name: plmn-specific-snssai-list
  in: query
  description: PLMN specific Slice info of the target NF
  content:
    application/json:
      schema:
        type: array
        items:
          $ref: 'TS29510_Nnrf_NFManagement.yaml#/components/schemas/PlmnSnssai'
        minItems: 1
- name: dnn
  in: query
  description: Dnn supported by the BSF, SMF or UPF
  schema:
    $ref: 'TS29571_CommonData.yaml#/components/schemas/Dnn'
- name: nsi-list
  in: query
  description: NSI IDs that are served by the services being discovered
  schema:
    type: array
    items:
      type: string
    minItems: 1
  style: form
  explode: false
- name: smf-serving-area
  in: query
  schema:
    type: string
- name: tai
  in: query
  description: Tracking Area Identity
  content:
    application/json:
      schema:
        $ref: 'TS29571_CommonData.yaml#/components/schemas/Tai'
- name: amf-region-id
```

```
        in: query
        description: AMF Region Identity
        schema:
          $ref: 'TS29571_CommonData.yaml#/components/schemas/AmfRegionId'
      - name: amf-set-id
        in: query
        description: AMF Set Identity
        schema:
          $ref: 'TS29571_CommonData.yaml#/components/schemas/AmfSetId'
      - name: guami
        in: query
        description: Guami used to search for an appropriate AMF
        content:
          application/json:
            schema:
              $ref: 'TS29571_CommonData.yaml#/components/schemas/Guami'
      - name: supi
        in: query
        description: SUPI of the user
        schema:
          $ref: 'TS29571_CommonData.yaml#/components/schemas/Supi'
      - name: ue-ipv4-address
        in: query
        description: IPv4 address of the UE
        schema:
          $ref: 'TS29571_CommonData.yaml#/components/schemas/Ipv4Addr'
      - name: ip-domain
        in: query
        description: IP domain of the UE, which supported by BSF
        schema:
          type: string
      - name: ue-ipv6-prefix
        in: query
        description: IPv6 prefix of the UE
        schema:
          $ref: 'TS29571_CommonData.yaml#/components/schemas/Ipv6Prefix'
      - name: pgw-ind
        in: query
        description: Combined PGW-C and SMF or a standalone SMF
        schema:
          type: boolean
      - name: pgw
        in: query
        description: PGW FQDN of a combined PGW-C and SMF
        schema:
          $ref: 'TS29510_Nnrf_NFManagement.yaml#/components/schemas/Fqdn'
      - name: gpsi
        in: query
        description: GPSI of the user
        schema:
          $ref: 'TS29571_CommonData.yaml#/components/schemas/Gpsi'
      - name: external-group-identity
        in: query
        description: external group identifier of the user
        schema:
          type: string
      - name: data-set
        in: query
        description: data set supported by the NF
        schema:
          $ref: 'TS29510_Nnrf_NFManagement.yaml#/components/schemas/DataSetId'
      - name: routing-indicator
        in: query
        description: routing indicator in SUCI
        schema:
          type: string
          pattern: '^[0-9]{1,4}$'
      - name: group-id-list
        in: query
        description: Group IDs of the NFs being discovered
        schema:
          type: array
          items:
            $ref: 'TS29571_CommonData.yaml#/components/schemas/NfGroupId'
          minItems: 1
        style: form
        explode: false
      - name: dnai-list
        in: query
        description: Data network access identifiers of the NFs being discovered
```

```
      schema:
        type: array
        items:
          $ref: 'TS29571_CommonData.yaml#/components/schemas/Dnai'
        minItems: 1
      style: form
      explode: false
    - name: pdu-session-types
      in: query
      description: list of PDU Session Type required to be supported by the target NF
      schema:
        type: array
        items:
          $ref: 'TS29571_CommonData.yaml#/components/schemas/PduSessionType'
        minItems: 1
      style: form
      explode: false
    - name: event-id-list
      in: query
      description: Analytics event(s) requested to be supported by the Nnwdaf_AnalyticsInfo service
      schema:
        type: array
        items:
          $ref: 'TS29520_Nnwdaf_AnalyticsInfo.yaml#/components/schemas/EventId'
        minItems: 1
      style: form
      explode: false
    - name: nwdaf-event-list
      in: query
      description: Analytics event(s) requested to be supported by the Nnwdaf_EventsSubscription service.
      schema:
        type: array
        items:
          $ref: 'TS29520_Nnwdaf_EventsSubscription.yaml#/components/schemas/NwdafEvent'
        minItems: 1
      style: form
      explode: false
    - name: supported-features
      in: query
      description: Features required to be supported by the target NF
      schema:
        $ref: 'TS29571_CommonData.yaml#/components/schemas/SupportedFeatures'
    - name: upf-iwk-eps-ind
      in: query
      description: UPF supporting interworking with EPS or not
      schema:
        type: boolean
    - name: chf-supported-plmn
      in: query
      description: PLMN ID supported by a CHF
      content:
        application/json:
          schema:
            $ref: 'TS29571_CommonData.yaml#/components/schemas/PlmnId'
    - name: preferred-locality
      in: query
      description: preferred target NF location
      schema:
        type: string
    - name: access-type
      in: query
      description: AccessType supported by the target NF
      schema:
        $ref: 'TS29571_CommonData.yaml#/components/schemas/AccessType'
    - name: limit
      in: query
      description: Maximum number of NFProfiles to return in the response
      required: false
      schema:
        type: integer
        minimum: 1
    - name: required-features
      in: query
      description: Features required to be supported by the target NF
      schema:
        type: array
        items:
          $ref: 'TS29571_CommonData.yaml#/components/schemas/SupportedFeatures'
        minItems: 1
```

```
      style: form
      explode: false
    - name: complex-query
      in: query
      description: the complex query condition expression
      content:
        application/json:
          schema:
            $ref: 'TS29571_CommonData.yaml#/components/schemas/ComplexQuery'
    - name: max-payload-size
      in: query
      description: Maximum payload size of the response expressed in kilo octets
      required: false
      schema:
        type: integer
        maximum: 2000
        default: 124
    - name: atsss-capability
      in: query
      description: ATSSS Capability
      content:
        application/json:
          schema:
            $ref: 'TS29571_CommonData.yaml#/components/schemas/AtsssCapability'
    - name: upf-ue-ip-addr-ind
      in: query
      description: UPF supporting allocating UE IP addresses/prefixes
      schema:
        type: boolean
    - name: client-type
      in: query
      description: Requested client type served by the NF
      content:
        application/json:
          schema:
            $ref: 'TS29572_Nlmf_Location.yaml#/components/schemas/ExternalClientType'
    - name: If-None-Match
      in: header
      description: Validator for conditional requests, as described in IETF RFC 7232, 3.2
      schema:
        type: string
  responses:
    '200':
      description: Expected response to a valid request
```

********************* Text Skipped for Clarify *********************

```
  StoredSearchResult:
    type: object
    required:
      - nfInstances
    properties:
      nfInstances:
        type: array
        items:
          $ref: '#/components/schemas/NFProfile'
  NFProfile:
    type: object
    required:
      - nfInstanceId
      - nfType
      - nfStatus
    properties:
      nfInstanceId:
        $ref: 'TS29571_CommonData.yaml#/components/schemas/NfInstanceId'
      nfInstanceName:
        type: string
      nfType:
        $ref: 'TS29510_Nnrf_NFManagement.yaml#/components/schemas/NFType'
      nfStatus:
        $ref: 'TS29510_Nnrf_NFManagement.yaml#/components/schemas/NFStatus'
      plmnList:
        type: array
        items:
          $ref: 'TS29571_CommonData.yaml#/components/schemas/PlmnId'
        minItems: 1
      sNssais:
        type: array
        items:
```

```yaml
      $ref: 'TS29571_CommonData.yaml#/components/schemas/Snssai'
    minItems: 1
perPlmnSnssaiList:
  type: array
  items:
    $ref: 'TS29510_Nnrf_NFManagement.yaml#/components/schemas/PlmnSnssai'
  minItems: 1
nsiList:
  type: array
  items:
    type: string
  minItems: 1
fqdn:
  $ref: 'TS29510_Nnrf_NFManagement.yaml#/components/schemas/Fqdn'
ipv4Addresses:
  type: array
  items:
    $ref: 'TS29571_CommonData.yaml#/components/schemas/Ipv4Addr'
  minItems: 1
ipv6Addresses:
  type: array
  items:
    $ref: 'TS29571_CommonData.yaml#/components/schemas/Ipv6Addr'
  minItems: 1
capacity:
  type: integer
  minimum: 0
  maximum: 65535
load:
  type: integer
  minimum: 0
  maximum: 100
locality:
  type: string
priority:
  type: integer
  minimum: 0
  maximum: 65535
udrInfo:
  $ref: 'TS29510_Nnrf_NFManagement.yaml#/components/schemas/UdrInfo'
udrInfoExt:
  type: array
  items:
    $ref: 'TS29510_Nnrf_NFManagement.yaml#/components/schemas/UdrInfo'
  minItems: 1
udmInfo:
  $ref: 'TS29510_Nnrf_NFManagement.yaml#/components/schemas/UdmInfo'
udmInfoExt:
  type: array
  items:
    $ref: 'TS29510_Nnrf_NFManagement.yaml#/components/schemas/UdmInfo'
  minItems: 1
ausfInfo:
  $ref: 'TS29510_Nnrf_NFManagement.yaml#/components/schemas/AusfInfo'
ausfInfoExt:
  type: array
  items:
    $ref: 'TS29510_Nnrf_NFManagement.yaml#/components/schemas/AusfInfo'
  minItems: 1
amfInfo:
  $ref: 'TS29510_Nnrf_NFManagement.yaml#/components/schemas/AmfInfo'
amfInfoExt:
  type: array
  items:
    $ref: 'TS29510_Nnrf_NFManagement.yaml#/components/schemas/AmfInfo'
  minItems: 1
smfInfo:
  $ref: 'TS29510_Nnrf_NFManagement.yaml#/components/schemas/SmfInfo'
smfInfoExt:
  type: array
  items:
    $ref: 'TS29510_Nnrf_NFManagement.yaml#/components/schemas/SmfInfo'
  minItems: 1
upfInfo:
  $ref: 'TS29510_Nnrf_NFManagement.yaml#/components/schemas/UpfInfo'
upfInfoExt:
  type: array
  items:
    $ref: 'TS29510_Nnrf_NFManagement.yaml#/components/schemas/UpfInfo'
  minItems: 1
```

```
    pcfInfo:
      $ref: 'TS29510_Nnrf_NFManagement.yaml#/components/schemas/PcfInfo'
    pcfInfoExt:
      type: array
      items:
        $ref: 'TS29510_Nnrf_NFManagement.yaml#/components/schemas/PcfInfo'
      minItems: 1
    bsfInfo:
      $ref: 'TS29510_Nnrf_NFManagement.yaml#/components/schemas/BsfInfo'
    bsfInfoExt:
      type: array
      items:
        $ref: 'TS29510_Nnrf_NFManagement.yaml#/components/schemas/BsfInfo'
      minItems: 1
    chfInfo:
      $ref: 'TS29510_Nnrf_NFManagement.yaml#/components/schemas/ChfInfo'
    chfInfoExt:
      type: array
      items:
        $ref: 'TS29510_Nnrf_NFManagement.yaml#/components/schemas/ChfInfo'
      minItems: 1
    nwdafInfo:
      $ref: 'TS29510_Nnrf_NFManagement.yaml#/components/schemas/NwdafInfo'
    customInfo:
      type: object
    recoveryTime:
      $ref: 'TS29571_CommonData.yaml#/components/schemas/DateTime'
    nfServicePersistence:
      type: boolean
      default: false
    nfServices:
      type: array
      items:
        $ref: '#/components/schemas/NFService'
      minItems: 1
    defaultNotificationSubscriptions:
      type: array
      items:
        $ref:
'TS29510_Nnrf_NFManagement.yaml#/components/schemas/DefaultNotificationSubscription'
    lmfInfo:
      $ref: 'TS29510_Nnrf_NFManagement.yaml#/components/schemas/LmfInfo'
    gmlcInfo:
      $ref: 'TS29510_Nnrf_NFManagement.yaml#/components/schemas/GmlcInfo'
NFService:
  type: object
  required:
    - serviceInstanceId
    - serviceName
    - versions
    - scheme
    - nfServiceStatus
```

\*\*\*\*\*\*\*\*\*\*\*\*\*\*\*\*\*\*\*\*\*\* Text Skipped for Clarify \*\*\*\*\*\*\*\*\*\*\*\*\*\*\*\*\*\*\*\*\*\*

Many advantages may be achieved by applying the proposed solution according to embodiments of the present disclosure. For example, with proposed solution, 5GC service framework can aware service producers which are serving a specific service type and/or a specific client type such as emergency service. An operator can deploy NF service instances specifically or dedicatedly serving a specific service type and/or a specific client type with higher serviceability (e.g. dedicated over-dimensioned resources to secure the availability and throughput). Service operations for a specific service type and/or a specific client type such as emergency service can be accurately relayed and handled by some NF service producers dedicatedly serving the specific service type and/or the specific client type to ensure the service quality.

Figure 16:
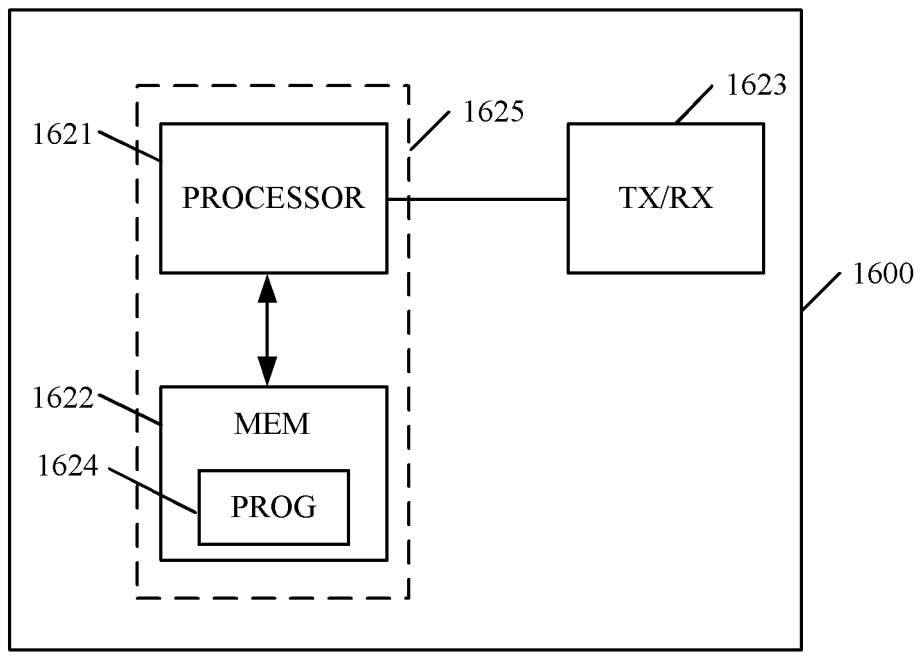
FIG. 16 is a block diagram showing an apparatus suitable for use in practicing some embodiments of the disclosure.

FIG. 16 is a block diagram showing an apparatus suitable for use in practicing some embodiments of the disclosure. For example, any one of the NF service consumer, the service discovery entity or the NF service producer as described above may be implemented through the apparatus 1600.

The apparatus 1600 comprises at least one processor 1621, such as a DP, and at least one MEM 1622 coupled to the processor 1621. The apparatus 1620 may further comprise a transmitter TX and receiver RX 1623 coupled to the processor 1621. The MEM 1622 stores a PROG 1624. The PROG 1624 may include instructions that, when executed on the associated processor 1621, enable the apparatus 1620 to operate in accordance with the embodiments of the present disclosure. A combination of the at least one processor 1621 and the at least one MEM 1622 may form processing means 1625 adapted to implement various embodiments of the present disclosure.

Various embodiments of the present disclosure may be implemented by computer program executable by one or more of the processor 1621, software, firmware, hardware or in a combination thereof.

The MEM 1622 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1621 may be of any type suitable to the local technical environment, and may include one or more of general purpose computers, special purpose computers, microprocessors, digital signal processors DSPs and processors based on multicore processor architecture, as non-limiting examples.

Figure 17:
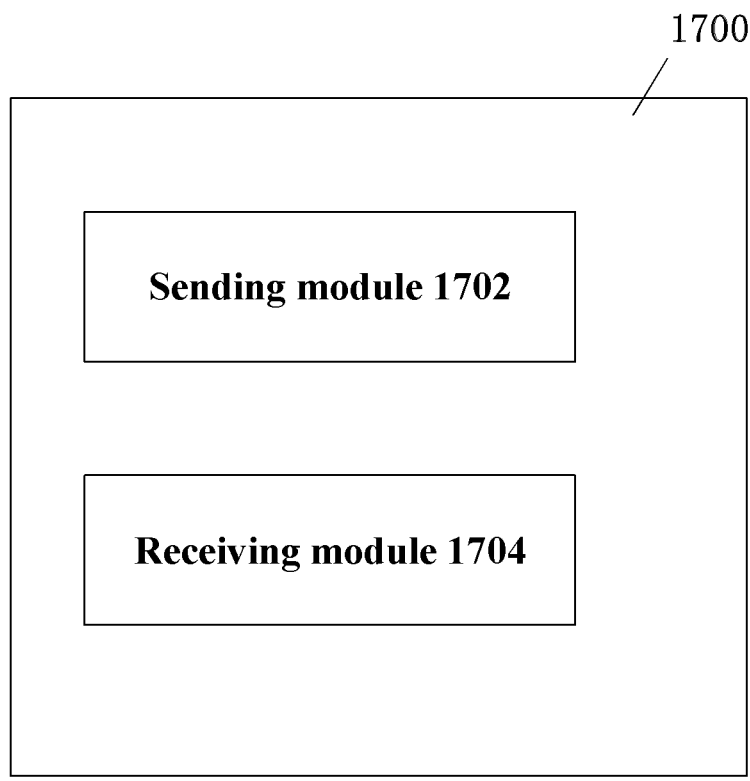
FIG. 17 is a block diagram showing a NF service consumer according to an embodiment of the disclosure.

FIG. 17 is a block diagram showing a NF service consumer according to an embodiment of the disclosure. As shown, the NF service consumer 1700 comprises a sending module 1702 and a receiving module 1704. The sending module 1702 may be configured to send a service request to a service discovery entity. The service request may include a parameter indicating a service type and/or a client type that one or more candidate target NFs can serve. The receiving module 1704 may be configured to receive a service response from the service discovery entity.

Figure 18:
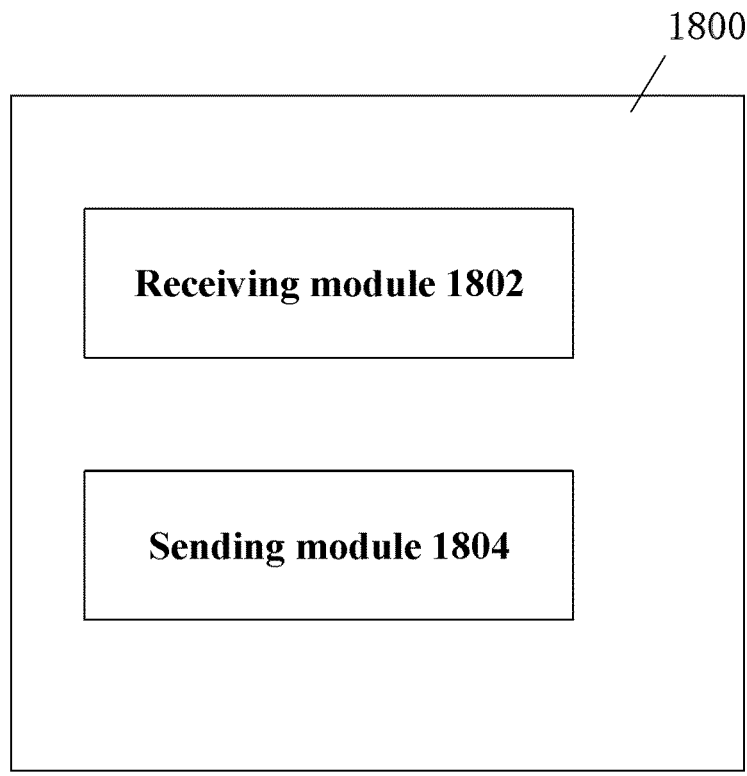
FIG. 18 is a block diagram showing a service discovery entity according to an embodiment of the disclosure.

FIG. 18 is a block diagram showing a service discovery entity according to an embodiment of the disclosure. As shown, the service discovery entity 1800 comprises a receiving module 1802 and a sending module 1804. The receiving module 1802 may be configured to receive a service request from a network function (NE) service consumer. The service request may include a parameter indicating a service type and/or a client type that one or more candidate target NFs can serve. The sending module 1804 may be configured to send a service response to the NF service consumer.

Figure 19:
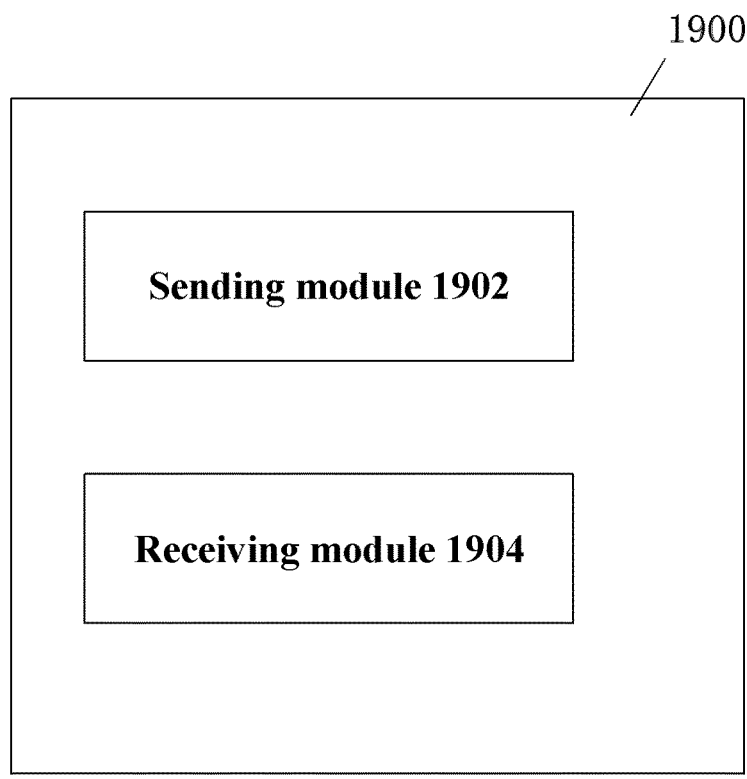
FIG. 19 is a block diagram showing a NF service producer according to an embodiment of the disclosure.

FIG. 19 is a block diagram showing a NF service producer according to an embodiment of the disclosure. As shown, the NF service producer 1900 comprises a sending module 1902 and a receiving module 1904. The sending module 1902 may be configured to send a NF service register request including the NF service producer's profile to a network repository function (NRF). The NF service producer's profile may include at least one service type and/or at least one client type that the NF service producer can dedicatedly serve. The receiving module 1904 may be configured to receive a NF service register response from the NRF.

According to an aspect of the disclosure it is provided a computer program product being tangibly stored on a computer readable storage medium and including instructions which, when executed on at least one processor, cause the at least one processor to carry out any of the methods related to the NF service consumer as described above.

According to an aspect of the disclosure it is provided a computer program product being tangibly stored on a computer readable storage medium and including instructions which, when executed on at least one processor, cause the at least one processor to carry out any of the methods related to the service discovery entity as described above.

According to an aspect of the disclosure it is provided a computer program product being tangibly stored on a computer readable storage medium and including instructions which, when executed on at least one processor, cause the at least one processor to carry out any of the methods related to the NF service producer as described above.

According to an aspect of the disclosure it is provided a computer-readable storage medium storing instructions which when executed by at least one processor, cause the at least one processor to carry out any of the methods related to the NF service consumer as described above.

According to an aspect of the disclosure it is provided a computer-readable storage medium storing instructions which when executed by at least one processor, cause the at least one processor to carry out any of the methods related to the service discovery entity as described above.

According to an aspect of the disclosure it is provided a computer-readable storage medium storing instructions which when executed by at least one processor, cause the at least one processor to carry out any of the methods related to the NF service producer as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a network function (NF) service consumer, comprising:
    sending a service request to a service discovery entity; and
    receiving a service response from the service discovery entity,
    wherein the service request includes a parameter indicating a client type that one or more candidate target NFs can serve, and wherein the service response includes information of at least one NF instance of a target NF when the target NF matching the service request can be found or includes information of at least one other NF instance not dedicatedly serving the client type when the target NF matching the service request cannot be found.

2. The method according to claim 1, wherein the service discovery entity is a first network repository function (NRF), the service request is an Nnrf_NFDiscovery_Request and the service response is an Nnrf_NFDiscovery_Request response.

3. The method according to claim 2, wherein the NF service consumer is also a NF service producer and the method further comprises:
    sending a NF service register request including a NF service producer's profile to a NRF, wherein the NF service producer's profile includes at least one service type, at least one client type, or both service type and client type, that the NF service producer can dedicatedly serve; and
    receiving a NF service register response from the NRF.

4. The method according to claim 3, further comprising:
    sending a NF service update request including a NF service producer's updated profile to a NRF, wherein the NF service producer's updated profile includes at least one updated service type, at least one updated client type, or both service type and client type, that the NF service producer can dedicatedly serve; and
    receiving a NF service update response from the NRF.

5. The method according to claim 3, wherein the service type, client type, or both service type and client type, includes at least one of:
    an emergency service;
    a value added service;
    an operator service;
    a lawful intercept service;
    a broadcast service;
    an operator operations & maintenance service;
    an operator anonymous statistics service; or
    an operator target mobile station service support service.

6. The method according to claim 2, wherein the NF service consumer is a second NRF in a second public land mobile network (PLMN) and the first NRF is a NRF in a first PLMN.

7. The method according to claim 6, further comprising:
    receiving the Nnrf_NFDiscovery_Request from another NF service consumer in the second PLMN; and
    sending the Nnrf_NFDiscovery_Request Response to said another NF service consumer in the second PLMN.

8. The method according to claim 7, wherein said another NF service consumer is a service communication proxy (SCP).

9. The method according to claim 1, wherein the service discovery entity is a service communication proxy (SCP), and the parameter indicating the client type is used as one of discovery and selection parameters.

10. The method according to claim 1, wherein the target NF is location management function (LMF) or gateway mobile location centre (GMLC).

11. The method according to claim 1, wherein the service request includes a client-type query parameter indicating one of external client types dedicatedly served by a target NF.

12. A method at a service discovery entity, comprising:
receiving a service request from a network function (NF) service consumer; and
sending a service response to the NF service consumer;
wherein the service request includes a parameter indicating a client type that one or more candidate target NFs can serve, and wherein the service response includes information of at least one NF instance of a target NF when the target NF matching the service request can be found or includes information of at least one other NF instance not dedicatedly serving the client type when the target NF matching the service request cannot be found.

13. The method according to claim 12, wherein the service discovery entity is a first network repository function (NRF), the service request is an Nnrf_NFDiscovery_Request and the service response is an Nnrf_NFDiscovery_Request response.

14. The method according to claim 13, wherein the NF service consumer is a second NRF in a second public land mobile network (PLMN) and the first NRF is a NRF in a first PLMN.

15. The method according to claim 12, further comprising:
receiving a NF service register request including a NF service producer's profile from a NF service producer, wherein the NF service producer's profile includes at least one client type that the NF service producer can dedicatedly serve;
storing the NF service producer's profile; and
sending a NF service register response to the NF service producer.

16. The method according to claim 15, further comprising:
receiving a NF service update request including a NF service producer's updated profile from the NF service producer, wherein the NF service producer's updated profile includes at least one updated client type that the NF service producer can dedicatedly serve;
updating the NF service producer's profile; and
sending a NF service update response to the NF service producer.

17. The method according to claim 12, wherein the service discovery entity is a service communication proxy (SCP), the parameter indicating the client type is used as one of discovery and selection parameters, and the method further comprising:
discovering and selecting a target NF service producer based on the discovery and selection parameters;
when the NF service consumer is authorized to communicate with the selected NF service producer, forwarding the service request to the selected NF service producer; and
receiving the service response from the selected NF service producer.

18. An apparatus at a network function (NF) service consumer, comprising:
a processor; and
a memory coupled to the processor, said memory containing instructions which, when executed by said processor, cause said apparatus to:
send a service request to a service discovery entity; and
receive a service response from the service discovery entity,
wherein the service request includes a parameter indicating a client type that one or more candidate target NFs can serve, and wherein the service response includes information of at least one NF instance of a target NF when the target NF matching the service request can be found or includes information of at least one other NF instance not dedicatedly serving the client type when the target NF matching the service request cannot be found.

19. The apparatus according to claim 18, wherein the service discovery entity is a network repository function (NRF), the service request is an Nnrf_NFDiscovery_Request and the service response is an Nnrf_NFDiscovery_Request response.

20. An apparatus at a service discovery entity, comprising:
a processor; and
a memory coupled to the processor, said memory containing instructions which, when executed by said processor, cause said apparatus to:
receive a service request from a network function (NF) service consumer; and
send a service response to the NF service consumer;
wherein the service request includes a parameter indicating a client type that one or more candidate target NFs can serve, and wherein the service response includes information of at least one NF instance of a target NF when the target NF matching the service request can be found or includes information of at least one other NF instance not dedicatedly serving the client type when the target NF matching the service request cannot be found.

21. The apparatus according to claim 20, wherein the service discovery entity is a network repository function (NRF), the service request is an Nnrf_NFDiscovery_Request and the service response is an Nnrf_NFDiscovery_Request response.

* * * * *